March 14, 1967

O. ERDMANN ET AL 3,308,600
MACHINE FOR MAKING AND HANDLING CIGARETTES
AND SIMILAR ARTICLES

Filed Aug. 14, 1962

Inventors:
OTTO ERDMANN
ADOLF SCHMID

BY Michael S. Striker their ATTORNEY

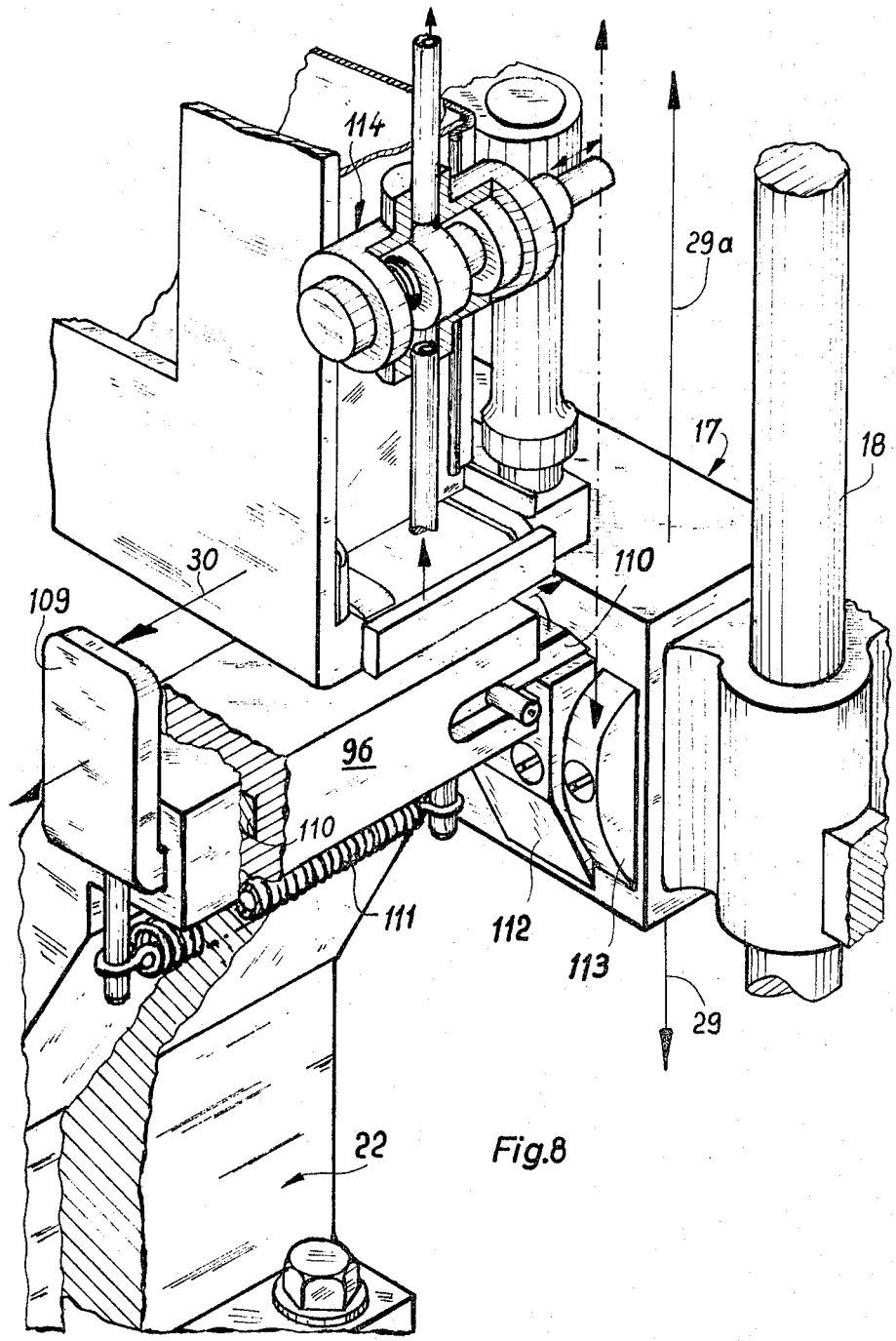

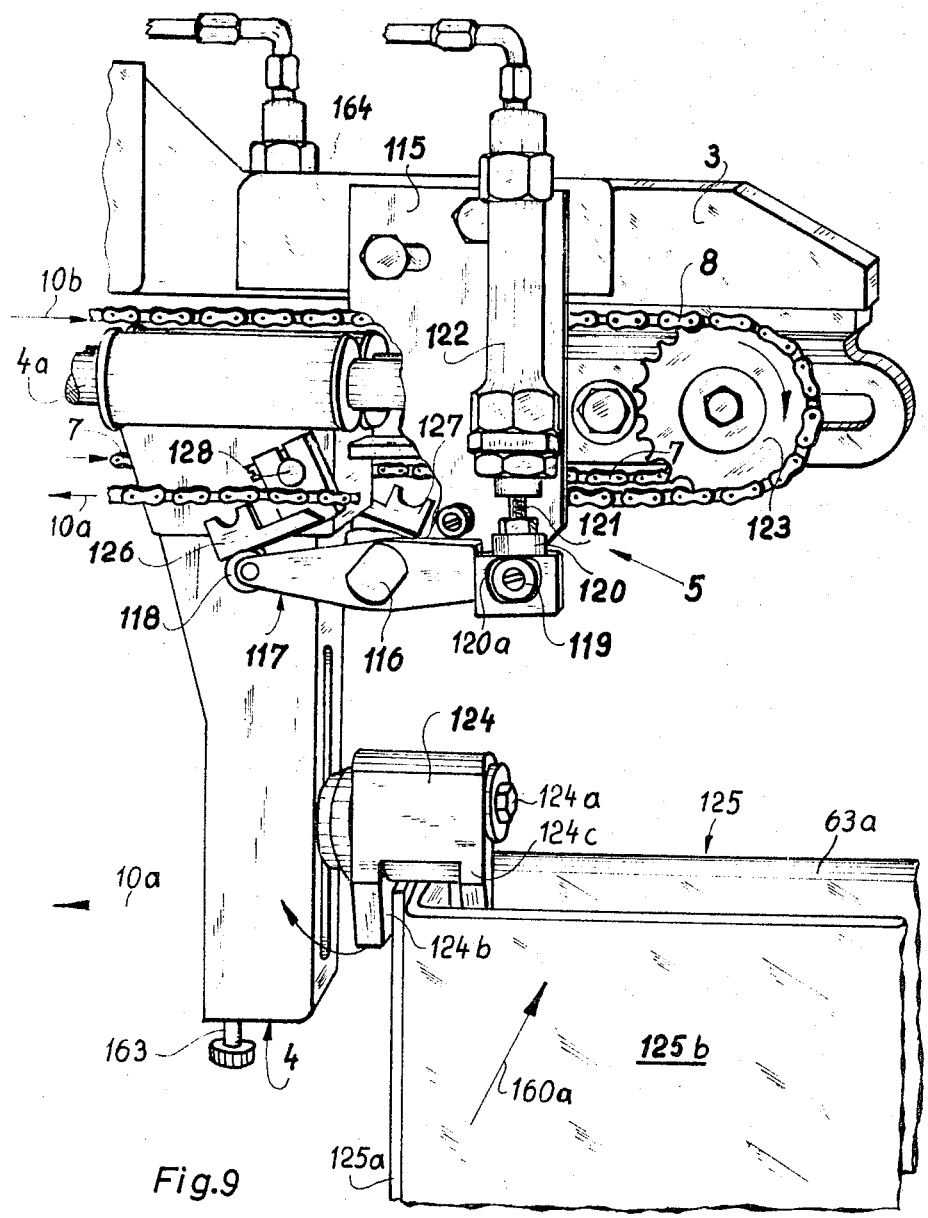

Inventors:
OTTO ERDMANN
ADOLF SCHMID
By Michael S. Striker
their ATTORNEY

March 14, 1967  O. ERDMANN ETAL  3,308,600
MACHINE FOR MAKING AND HANDLING CIGARETTES
AND SIMILAR ARTICLES
Filed Aug. 14, 1962  11 Sheets-Sheet 10

Inventors:
OTTO ERDMANN
ADOLF SCHMID
By Michael S. Striker
their ATTORNEY

3,308,600
MACHINE FOR MAKING AND HANDLING CIGARETTES AND SIMILAR ARTICLES
Otto Erdmann and Adolf Schmid, Hamburg-Bergedorf, Germany, assignors to Hauni-Werke Koerber & Co. K.G., Hamburg-Bergedorf, Germany
Filed Aug. 14, 1962, Ser. No. 216,805
Claims priority, application Great Britain, Aug. 18, 1961, 29,884/61; Aug. 28, 1961, 30,912/61; Nov. 16, 1961, 41,026/61
29 Claims. (Cl. 53—236)

The present invention relates to machines for the manufacture of tobacco-containing products, and more particularly to improvements in an apparatus which forms part of such machines and which is utilized for automatically assembling, stacking, storing and circulating cigars, cigarillos, cigarettes, filter tip cigarettes, filters and similar stick-shaped articles which, either by themselves or with one or more additional articles, form tobacco containing products. Still more particularly, the invention relates to an apparatus which is adapted to circulate storing devices for cigarettes and similar articles in a machine which is utilized for mass-manufacture and processing of tobacco containing products. In the following description, the articles manufactured, stacked, circulated or otherwise processed in the machine of our invention will be called cigarettes or filter tip cigarettes with the understanding, however, that the machine is equally suited for the production and handling of other types of stick-shaped articles.

In a copending application Serial No. 181,669 of Horst Kochalski et al. and assigned to the same assignee, now U.S. Patent No. 3,190,459, there is disclosed a machine which is utilized for making, advancing, stacking and storing cigarettes and similar products. Another copending application Ser. No. 208,737 filed July 10, 1962 by Willy Rudszinat et al. and assigned to the same assignee, now U.S. Patent No. 3,250,056, discloses an apparatus for circulating trays and similar storing devices which may be utilized in the machine of the Kochalski et al. application. The circulating apparatus of Rudszinat et al. is constructed and assembled to circulate a special type of storing device and, therefore, at least some adjustments are necessary to convert the circulating apparatus of Rudszinat et al. for use with differently configurated and/or dimensioned storing devices.

Accordingly, it is an important object of our invention to provide an apparatus for circulating trays and similar storing devices for cigarettes and the like which is constructed and assembled in such a way that it may be utilized in connection with different types of storing devices without necessitating any or by necessitating only minimal adjustments at the time it becomes necessary to change from one to another type of storing device.

Another object of the invention is to provide a circulating apparatus of the just outlined characteristics which is built into and which is assembled with a cigarette making machine in such a way that it can circulate different types of storing devices at the same rate at which the cigarettes are being produced regardless of the output of the cigarette making machine.

A further object of the invention is to provide a fully automatic actuating system for an apparatus of the above outlined characteristics.

An additional object of our invention is to provide a very compact and comparatively simple apparatus for circulating different types of storing devices in a cigarette making machine.

Still another object of our invention is to provide a circulating apparatus of the above outlined characteristics which is constructed and assembled in such a way that, in addition to circulating different types of storing devices through a cigarette making machine, it also withdraws and deposits storing devices onto or into suitable magazines so that the admission and discharge of storing devices occur without any supervision in a full automatic way.

A concomitant object of the invention is to provide a circulating apparatus of the above outlined characteristics which is capable of receiving, advancing and discharging differently dimensioned storing devices without any adjustments in the position of its component parts and without in any way affecting the transfer of cigarettes even if one of two consecutive storing devices is different from the other storing device.

An additional object of the invention is to provide a control system for a circulating apparatus of the above outlined characteristics which is assembled and which operates in such a way that it protects storing devices against shocks such as could cause the cigarettes to lose some of the tobacco or which would cause undesirable deformation of stacked articles.

With the above objects in view, the invention resides in the provision of an apparatus for circulating storing devices for cigarettes and similar articles along a transfer station at which the articles are transferred into and at least partially fill the storing devices. The circulating apparatus is preferably integrated into a cigarette making machine and comprises a frame, at least one series of several components forming a specially constructed carrier unit which is adapted to accommodate and to hold a storing device, guide means provided in the frame and defining an endless path including a preferably vertical path section in which the carrier may advance while passing along the transfer station, advancing means for moving the carrier unidirectionally in such endless path, and means for delivering empty storing devices into and for withdrawing filled storing devices from the carrier at a point upstream of the aforementioned path section so that a filled storing device accommodated in the carrier may be withdrawn and that an empty storing device may be introduced into the carrier before the latter advances along the transfer station.

The circulating apparatus preferably comprises two carriers which are mounted in the endless path in such a way that one thereof trails and is spaced from the other carrier, and the advancing means for the carriers preferably comprises two reciprocable platforms one of which is movable along the transfer station to support a carrier at the time the storing device accommodated in such carrier is being filled with articles, and the other of which thereupon advances the carrier accommodating a filled storing device to that point at which a filled storing device is withdrawn from and an empty storing device is delivered into the carrier.

In accordance with an important feature of our invention, the carriers are constructed and assembled in such a way that each thereof may accommodate and properly hold differently dimensioned storing devices. Each carrier comprises an elongated bottom wall, a rear wall, and holder means provided on at least one of its walls for engaging and for retaining a storing device in a manner to insure that the holding device is movable only in the longitudinal direction of the bottom wall so that it may be delivered into or withdrawn from the storing device.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 7 illustrates a further portion of the advancing means for the carriers which is utilized for moving the carriers along a horizontal third section of the endless path shown in FIG. 3;

FIG. 8 is a larger-scale perspective view of a detail of the structure shown in FIG. 7;

FIG. 9 illustrates one of two coupling mechanisms which form part of a means for delivering a filled storing device into and for withdrawing an empty storing device from a wheel-mounted conveyance or a similar magazine which is coupled to the circulating apparatus;

Figure 1:
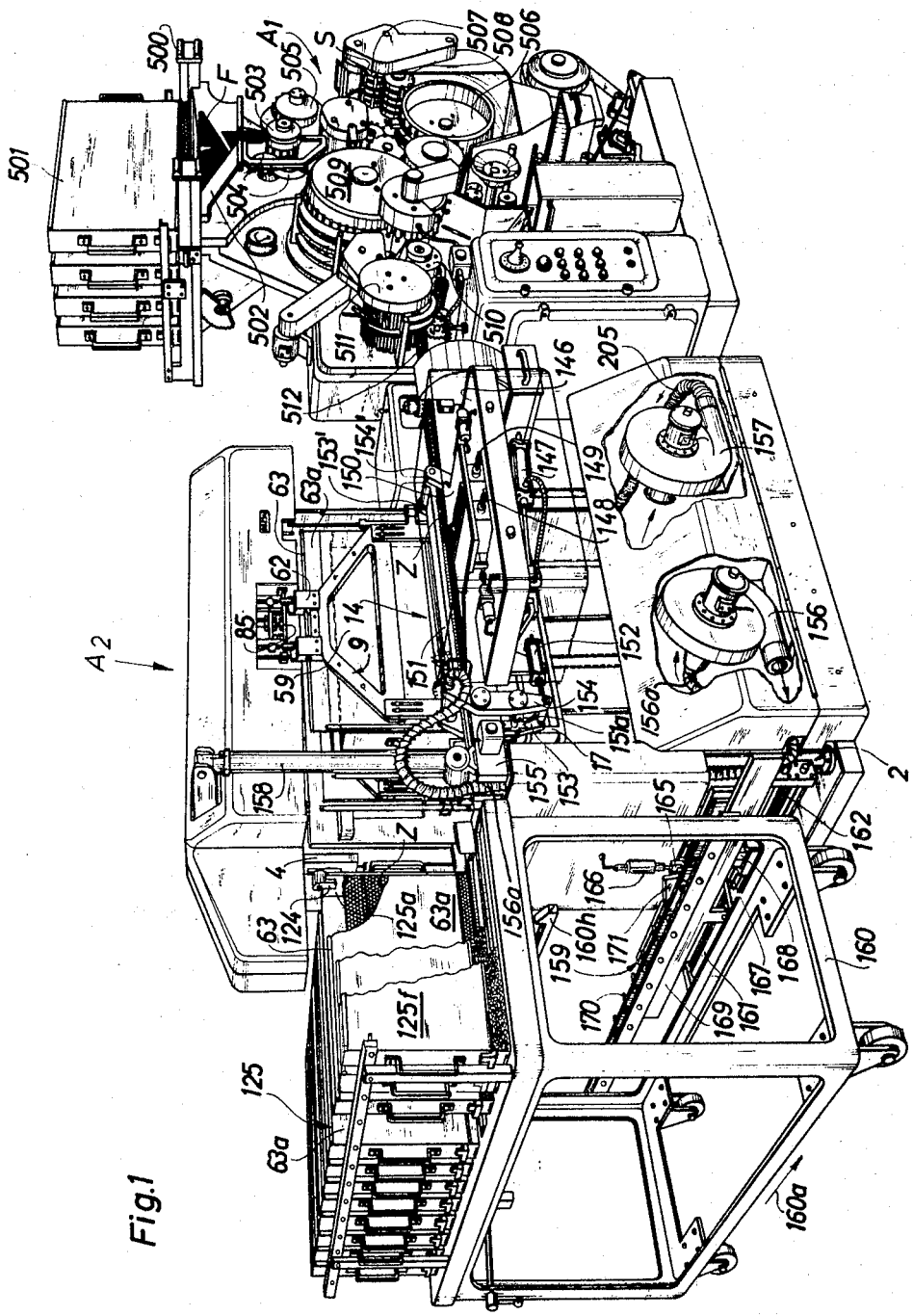
FIG. 1 is a perspective view of a cigarette making machine comprising a circulating apparatus which embodies our invention.

Referring now in greater detail to the drawings, and first to FIG. 1, there is shown a cigarette making machine which is utilized for the manufacture of filter tip cigarettes. This machine comprises a first main component $A_1$ which serves to assemble filters F and cigarette sticks S into filter tip cigarettes Z. The exact construction of the component $A_1$ forms no part of our invention, and this component has been shown solely for the purpose of illustrating the manner in which a horizontal layer of filter tip cigarettes Z is continuously advanced into a second main component $A_2$ which includes a pneumatic row assembling device or lifter 151 located at a transfer station 14, a transferring assembly including a plate-like transfer element 150 which cooperates with the lifter 151 to transfer consecutively assembled rows of cigarettes into a storing device or tray which descends along the transfer station 14, a circulating apparatus which is adjacent to the transfer station 14 and which is shown in greater detail in FIG. 2, and a magazine 160 which carries a supply of empty storing devices and which may accommodate one or more filled storing devices.

Aside from the circulating apparatus, the remaining details of the machine shown in FIG. 1 form no part of our invention and such details will be described only to the extent necessary for full understanding of the invention.

The component $A_1$ comprises a raised platform 500 for a series of trays 501 which contain stacked filters F of multiple length. These filters are discharged into a hopper 502 and thence into peripheral pockets of a revolving drum 503 which cooperates with rotary cutters 504 to subdivide the filters, whereupon the subdivided filters are caused to form a single row while advancing along the periphery of a drum 505 and toward an assembling drum 506 which receives the filters in such a way that each thereof enters between a pair of spaced coaxial cigarette sticks S. The sticks are delivered by two supply drums 507, 508 and the groups including two cigarette sticks and a twin-length filter therebetween are thereupon transferred into a wrapping drum 509 which applies adhesive-coated wrappers in such a way that the wrappers are convoluted about the filters and about the adjacent end portions of the cigarette sticks to form filter tip cigarettes of twin length. While passing about a further drum 510, the twin-length cigarettes are cut in half and one of each pair of aligned cigarettes is inverted through 180 degrees while passing about a re- of cigarettes Z above the upper run of the take-off conveyor 512 which thereupon advances a single layer of filter tip cigarettes Z toward the transfer station 14.

The lifter 151 is a pneumatically operated device which serves as a means for automatically lifting rows of cigarettes Z above the upper run of the take-off conveyor 512 so that each row contains a predetermined number of cigarettes. This lifter is mounted on two pairs of two-armed levers 153, 154 and 153', 154' in a manner as described in the Kochalski et al. application Ser. No. 181,669 so that it may descend toward the upper run of the conveyor 512 in order to assemble a new row of cigarettes and to thereupon rise above the conveyer and to permit forward movement of cigarettes Z along this conveyer in a direction to the left, as viewed in FIG. 1. The levers 153, 154 are rockable by the piston rod of a pneumatic cylinder 152.

Figure 12A:
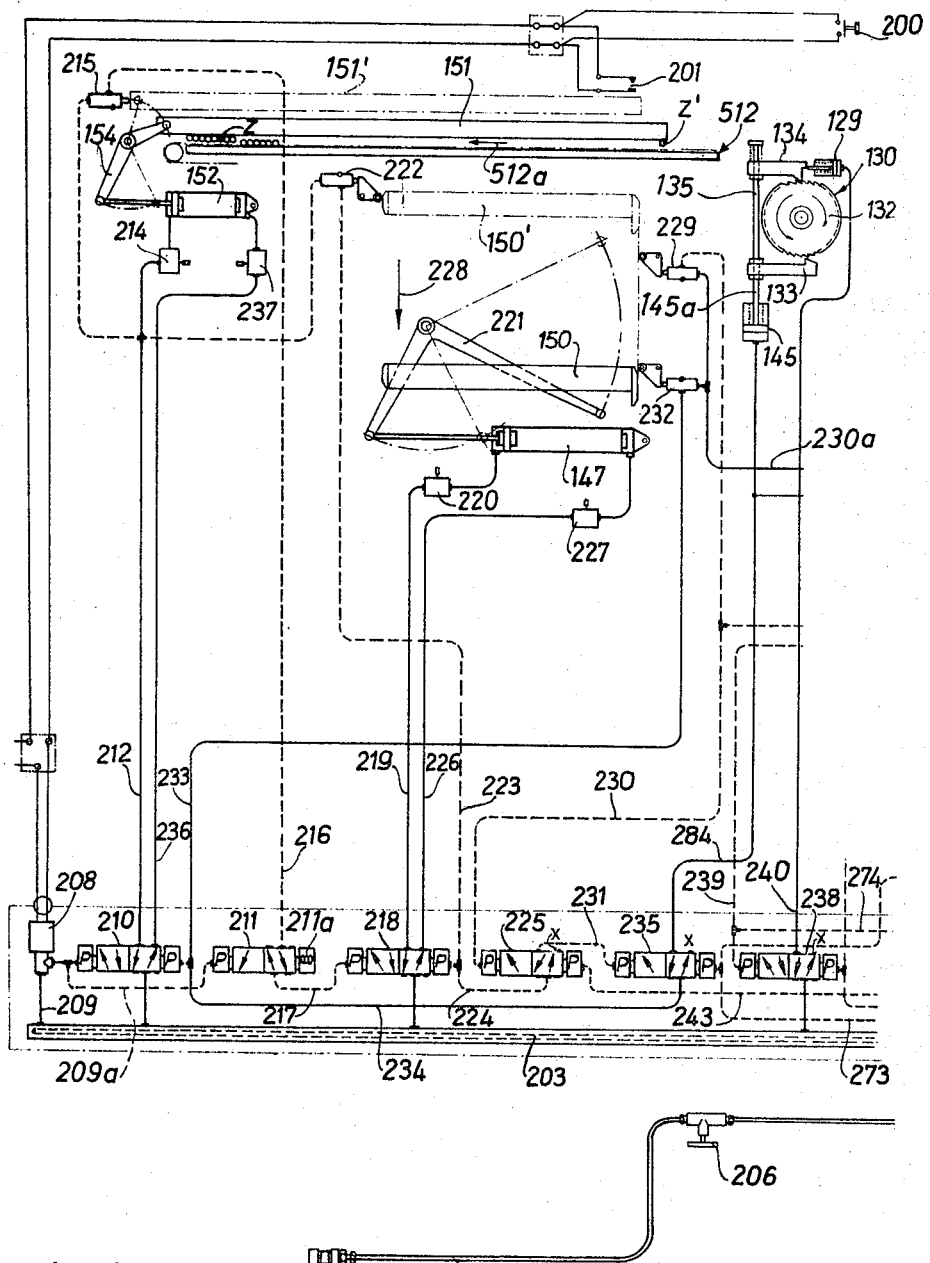
FIGS. 12a and 12b are diagrammatic exploded views of certain elements of the cigarette making machine, further showing a pneumatic system which controls the operation of the circulating apparatus.

The transferring element 150 assumes the form of a horizontal plate or ram whose leading edge is located at the level of a newly assembled row of cigarettes when the lifter 151 is caused to move to its raised position. This element 150 is reciprocable in a horizontal plane and is mounted on a pair of horizontal guide rods 148, 149 provided at the upper side of a supporting table 146. The means for reciprocating the transferring element 150 comprises a pneumatic cylinder 147 which is mounted at the underside of the table 148 and whose piston rod transmits motion to the element 150 through a suitably mounted two-armed lever 221 which is shown in FIG. 12a. The table 146 and the levers 153, 154, 153', 154' are mounted on a horizontal bar 155 which forms part of an apparatus frame 2.

Figure 12B:
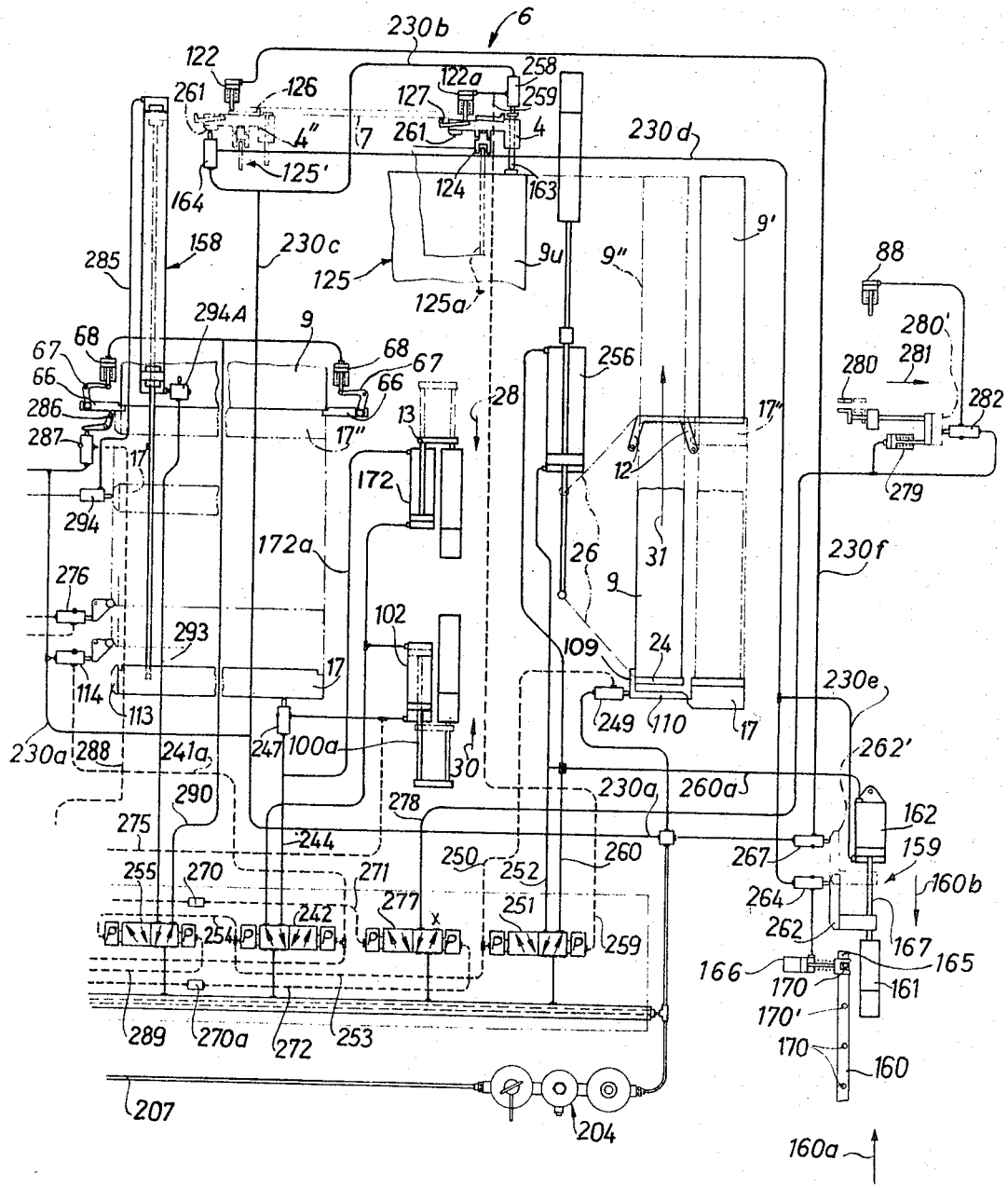

The lower part of the component $A_2$ accommodates a suction producing fan 156 which is connected with the lifter 151 by a flexible conduit 156a, and an air compressor 157 which is connected with a series of pneumatic cylinders including the aforementioned cylinders 147 and 152 in a manner to be described in full detail in connection with FIGS. 12a and 12b.

FIG. 1 further shows a carrier 9 which accommodates a storing device and which descends in stepwise fashion along the transfer station 14 so that the storing device receives rows of cigarettes assembled by the lifter 151. The arrangement is such that the lifter moves back and forth along the upper run of the conveyer 512 in order to stagger consecutively formed rows of cigarettes Z in such a way that the cigarettes of a newly assembled row are deposited in gaps defined by the cigarettes of the uppermost row in the storing device. The staggering mechanism which causes such reciprocatory movements of the lifter 151 is shown at 151a and is fully described in the aforementioned application Serial No. 181,669.

Figure 2:
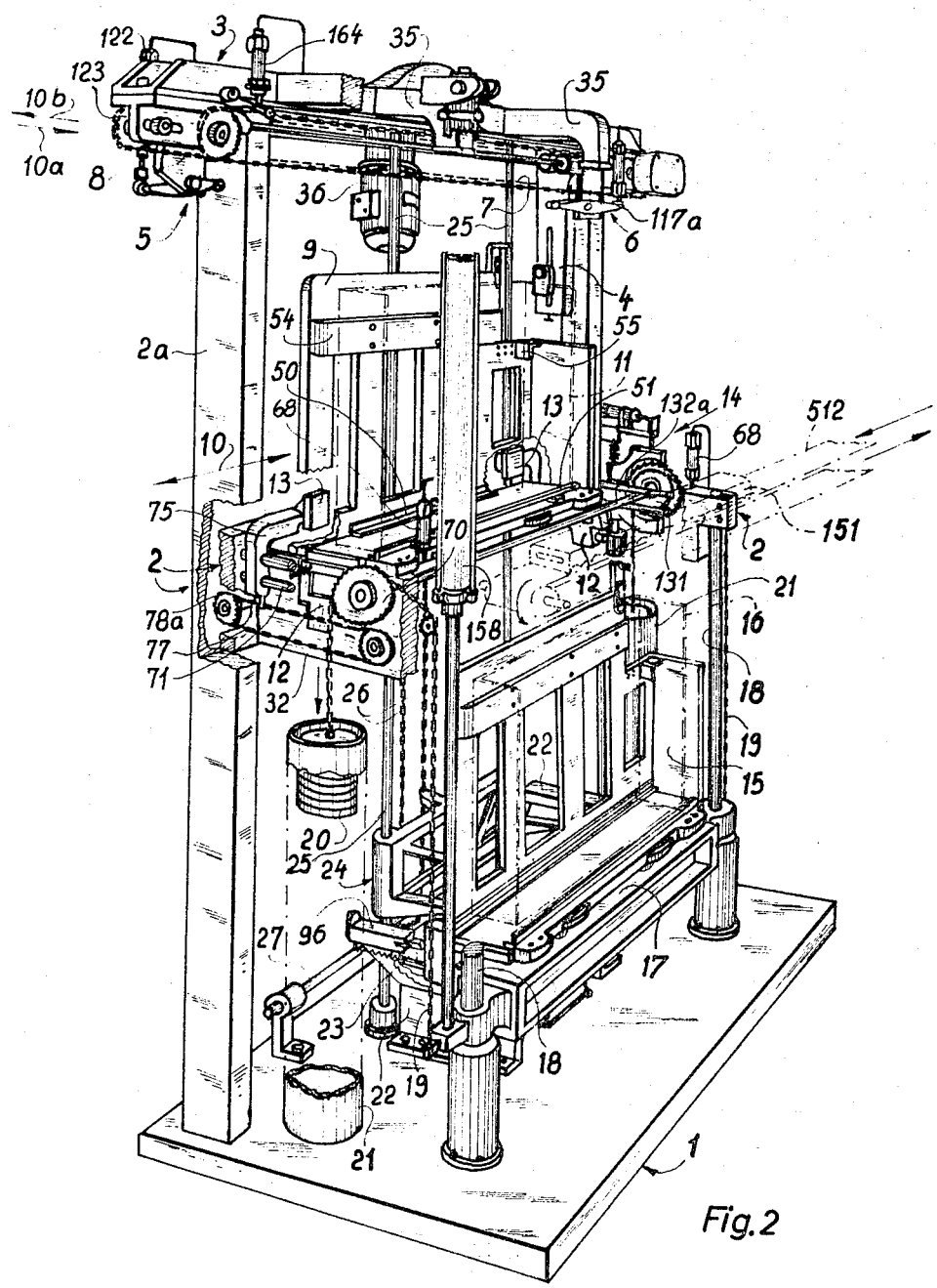
FIG. 2 is a perspective view of the circulating apparatus.
Figure 10:
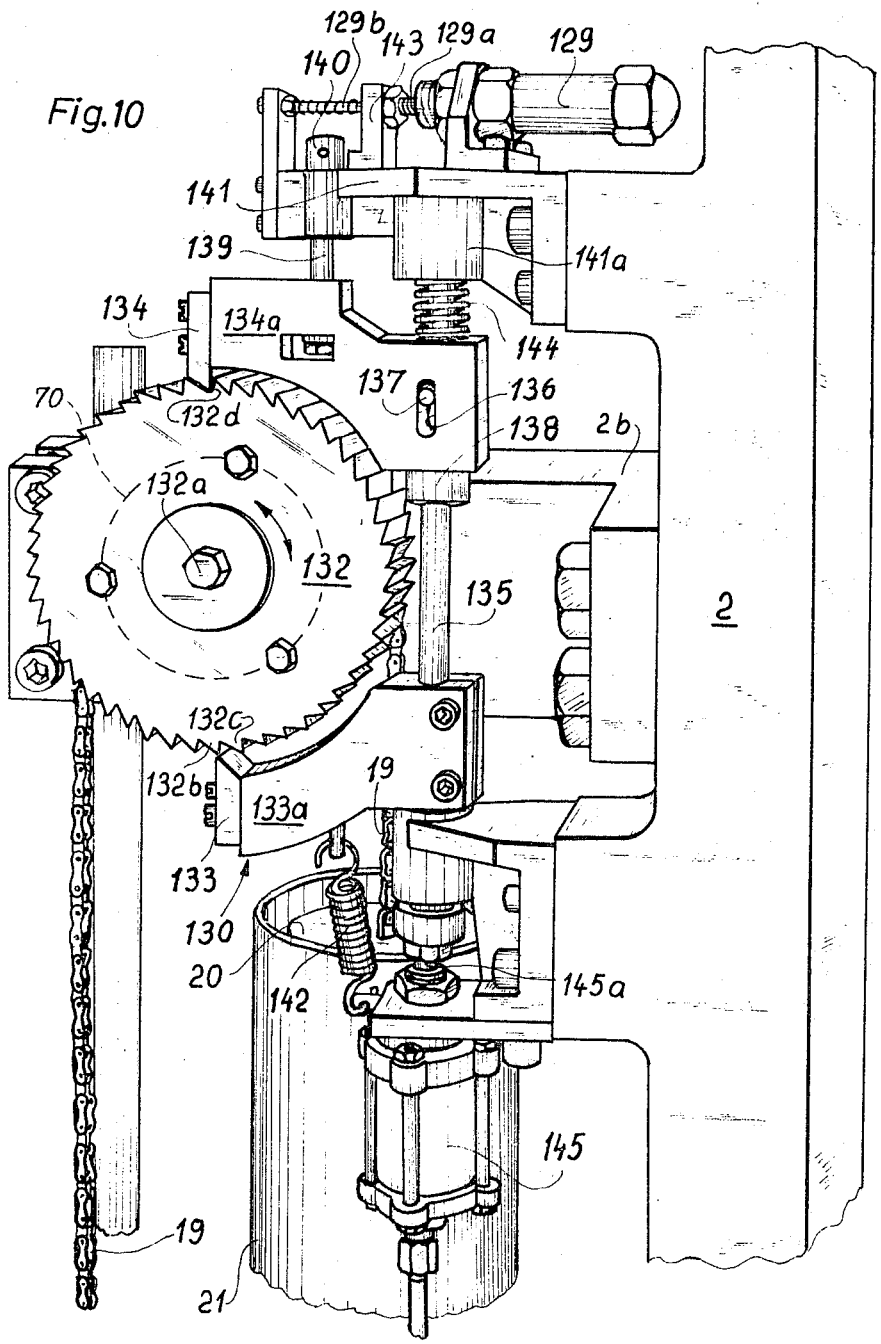
FIG. 10 is a perspective view of still another portion of the advancing means including a braking mechanism which is utilized for regulating the descent of a carrier along the transfer station.

The carrier 9 is mounted in the frame 2 and is moved unidirectionally in an endless path by an advancing means including a front platform 17 which is movable up and down, substantially without friction, along the transfer station 14 by a pneumatic cylinder 158 and by a system of counterweights 20 shown in FIG. 2. The weight of the platform 17 and of the parts supported thereon increases gradually as the platform descends along the station 14 since the element 150 transfers newly assembled rows of cigarettes Z into that storing device which is momentarily accommodated in the carrier 9 at the same rate at which such rows are assembled by the lifter 151. The cylinder 158 then assists the counterweights 20 to insure rapid descent of the platform 17 in cooperation with a specially constructed braking mechanism 130 which is shown in FIG. 10.

The magazine 160 is coupled to that side of the circulating apparatus which faces away from the component $A_1$. The connection between the magazine 160 and the frame 2 of the circulating apparatus is such that the magazine automatically moves through a distance equal to or slightly exceeding the width of a storing device when a filled storing device 125f is returned onto the magazine whereby an empty storing device 125 is automatically moved into a position in which it may be engaged by the advancing means of the circulating apparatus to be conveyed in an endless path which includes a vertical path section extending along the transfer station 14. The means for moving the magazine 160 comprises a mechanism 159 which includes a shock absorber 161 cooperating with a pneumatic cylinder 162, the latter providing the necessary force for intermittently moving the magazine 160 along the circulating apparatus (arrow 160a). The cylinder 162 is controlled by a valve 164 (FIGS. 2, 9, 12b) which is actuated in a fully automatic way when a carriage 4 engages a coupling device 5. The magazine 160 is normally locked by a spring-biased bolt 165 which may release the magazine in response to actuation of a pneumatic cylinder 166 and which remains inoperative for a period of time required to move the magazine through a predetermined distance necessary to bring an empty storing device into alignment with the carriage 4. The piston rod 167 of the cylinder 162 transmits motion to a lever 168 which engages a rail 169, and this rail transmits motion to a pawl 171 which cooperates with pins 170 carried by the magazine 160. The construction and operation of the mechanism 159 are fully disclosed in the aforementioned application Ser. No. 208,737 of Rudszinat et al.

Referring now to FIG. 2, there is shown a circulating apparatus which embodies our invention and which includes a base plate 1 for the frame 2, the latter including a horizontal crosshead 3 at the upper end thereof. This crosshead supports the carriage 4 which is reciprocable in a straight horizontal path and which forms part of a means for delivering storing devices into and for withdrawing storing devices from the circulating apparatus.

The purpose of the carriage 4 is to withdraw empty storing devices 125 from the magazine 160 and to return filled storing devices 125f onto the magazine.

The crosshead 3 comprises two spaced forwardly extending brackets 35 which serve as a means for supporting a specially constructed mechanism utilized for maintaining in raised position a front wall or cover 42 which forms part of the carrier 9 or of a second carrier 15. This mechanism will be described in connection with FIG. 6.

Figure 6:
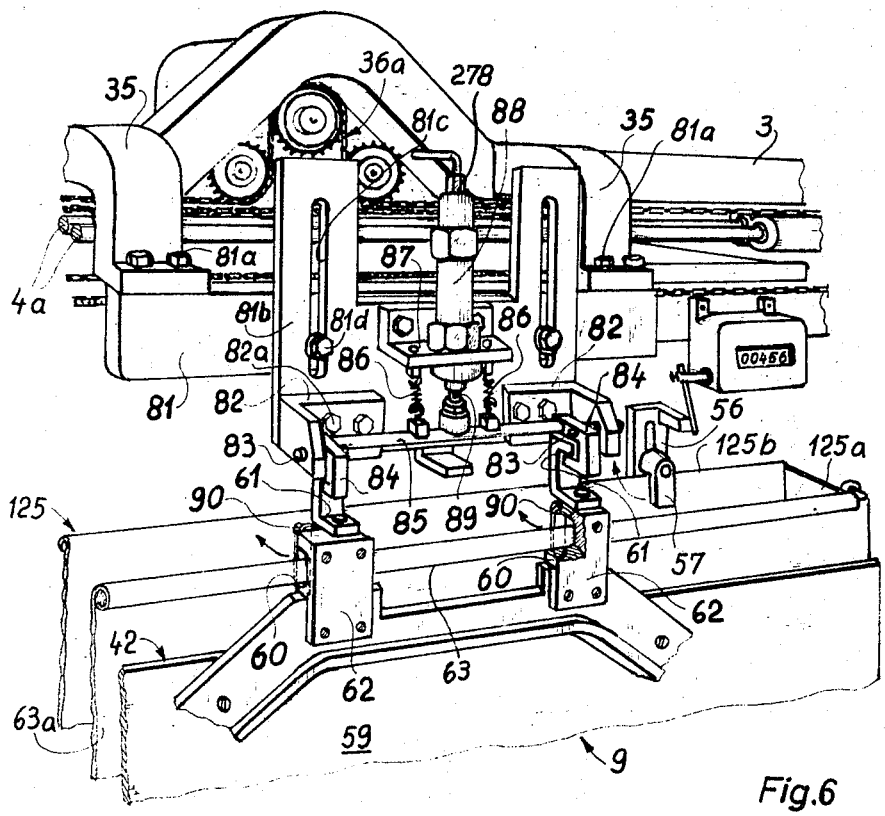
FIG. 6 illustrates a mechanism which maintains the front wall of a carrier in raised position while the carrier descends in a second section of the endless path which extends along a transfer station of the cigarette making machine at which a storing device accommodated in the descending carrier receives consecutively assembled rows of cigarettes.

The carriage 4 is reciprocable by chains 7, 8 which are driven at constant speed and without interruption by a motor 36 mounted on the crosshead 3. The operative connection 36a between the motor 36 and the chains 7, 8 is indicated in FIG. 6. In addition to the aforementioned coupling device 5 which is mounted at one end of the crosshead 3, the latter supports at its other end a second coupling device 6, and the purpose of these coupling devices is to alternately establish an operative connection between the carriage 4 and the chain 7 or 8 so that the carriage may move along the crosshead 3 in a direction to the right, as viewed in FIG. 2. when it entrains an empty storing device 125 into the circulating apparatus and in a direction to the left when it returns a filled storing device 125f onto the magazine 160. If it were shown in FIG. 2, the magazine 160 would be adjacent to the upright 2a of the frame 2, and it will be noted that the sheet metal housing which surrounds certain parts of the circulating apparatus and which is illustrated in FIG. 1 has been omitted from FIG. 2 for the sake of clarity.

The carrier 9 is shown in FIG. 2 in a position it assumes when it is ready to receive a storing device 11 which is indicated in phantom lines. This storing device is movable by the carriage 4 in directions indicated by a double-headed arrow 10. It is assumed that the storing device 11 is of the type which is without a cover, that is to say without a front wall, whereby its interior is accessible from the transfer station 14 so that the lifter 151 (shown in phantom lines) may cooperate with the element 150 (not shown in FIG. 2) to transfer consecutively assembled rows of cigarettes into the storing device 11 which descends with the carrier 9 in stepwise fashion through distances approximating the diameter of a cigarette Z.

Figure 5:
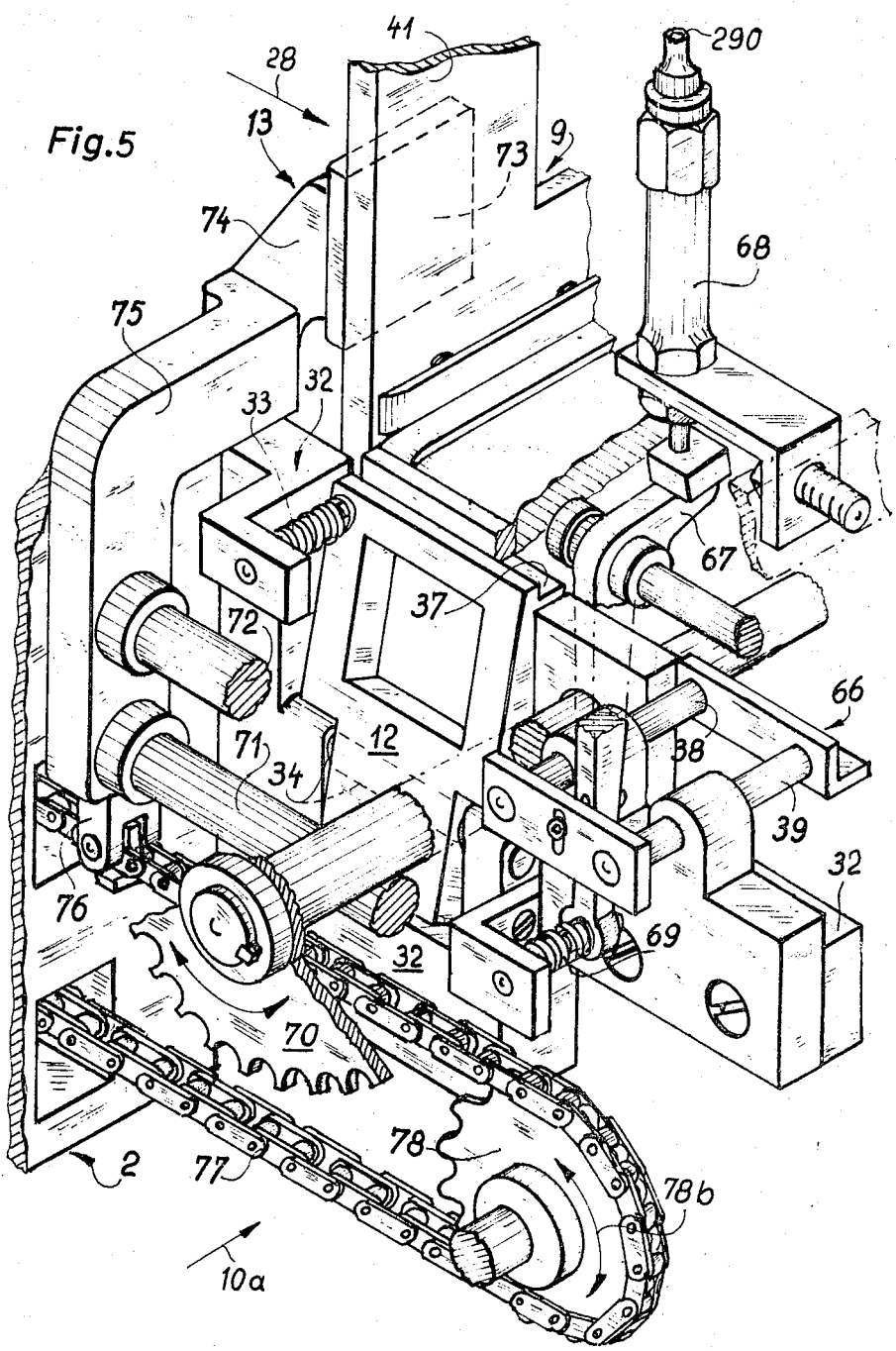
FIG. 5 is an enlarged fragmentary perspective view of a detail of the circulating apparatus, showing that portion of the advancing means which causes the carriers to move along a horizontal first section of the endless path shown in FIG. 3.

The carrier 9 is supported by a pair of spaced spring-biased guide brackets 12 one of which is shown in greater detail in FIG. 5. That portion of the advancing means which moves the carrier 9 forwardly, as viewed in FIG. 2 (i.e., in a horizontal direction and at right angles to the direction indicated by arrow 10), comprises a pair of motion transmitting members here shown as brackets 13 whose function is to move the carrier 9 and the storing device 11 into such close proximity of the transfer station 14 that the storing device is within reach of the transferring element 150 and that the latter may transfer consecutively assembled rows of cigarettes into the interior of this storing device.

FIG. 2 illustrates a second carrier 15 which is momentarily located at a level below the transfer station 14 and which accommodates a filled storing device 16, shown in phantom lines. The storing device 16 is without a front wall or cover and has been filled with cigarettes while descending with the carrier 15 along the transfer station 14. The carrier 15 rests on the front platform 17 which is slidably guided by vertical guide rods 18 and is connected with chains 19 carrying counterweights 20 accommodated in tubular shields 21. When the carrier 15 assumes its lowermost position, its bottom wall comes to rest on two spaced guide members here shown as guideways 22 along which it can move rearwardly into the plane of the carrier 9 to be thereupon lifted by a rear platform 24. That portion of the guide means which includes the guideways 22 further comprises two spaced horzontal guide rods 23, and the rear platform 24 is reciprocable along vertical guide rods 25 by a chain 26 which is trained around a pair of sprockets including a lower sprocket 108 (see FIG. 7) mounted on a horizontal shaft 27 rotatable in bearings supported by the base plate 1. The upper sprocket for the chain 26 is mounted on a second horizontal shaft (not shown) which is rotatable in bearings supported by the frame 2.

Figure 3:
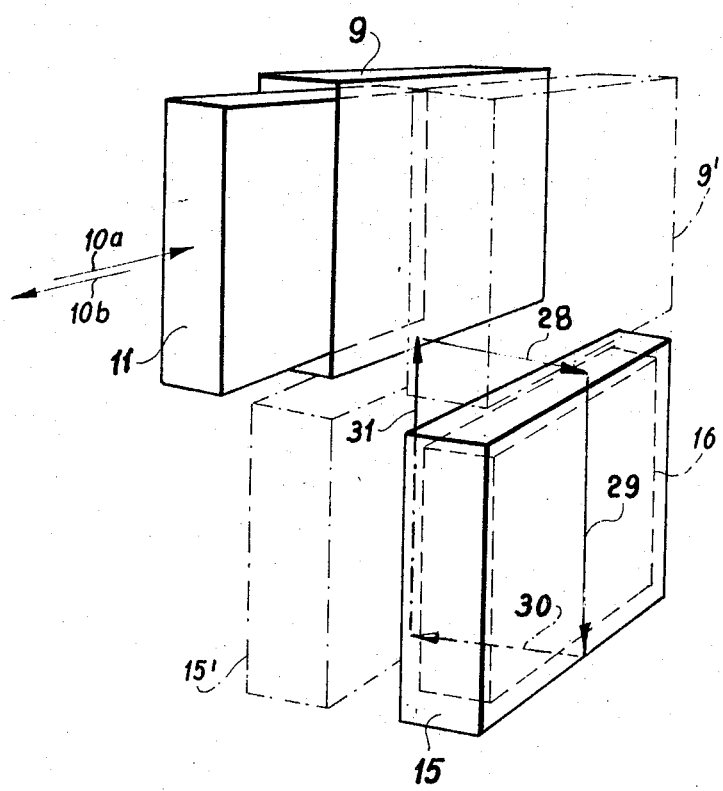
FIG. 3 is a schematic perspective view of the endless path for a pair of carriers which form part of the circulating apparatus.

Before proceeding with a more detailed description of the means which moves storing devices in directions indicated by the arrow 10 and of the advancing means (including the platforms 17, 24) which moves the carriers through the circulating apparatus of FIG. 2, we will now refer to FIG. 3 which is a schematic diagram showing the manner in which the carriers 9, 15 are caused to move in an endless path located in a vertical plane perpendicular to the straight path of the carriage 4 indicated by arrow 10. For the sake of clarity, the carriers 9, 15 are shown as boxes whose sides are open to permit entry or removal of storing devices. The full-line position of the carrier 9 corresponds to that shown in FIG. 2, and it will be noted that the carrier 9 is then located at a certain point of its endless path and is ready to receive an empty coverless storing device 11 which is advanced by the carriage 4 in a direction indicated by arrow 10a, i.e., from the magazine 160 and into the circulating apparatus of FIG. 2. Once the storing device 11 is properly accommodated in the carrier 9, the carrier is advanced by the motion transmitting brackets 13 to move in a direction indicated by arrow 28 and to transfer the storing device into the general plane of the front platform 17. Thus, the arrow 28 indicates a horizontal first section of the endless path in which the carriers 9, 15 circulate in the apparatus of FIG. 2.

In the next step, the carrier 9 (which now assumes the phantom-line position 9' of FIG. 3) and the storing device 11 are moved downwardly along a vertical second section of the endless path (arrow 29) while passing along the transfer station 14 so that the storing device 11 may receive rows of cigarettes and is at least partially filled at the time the carrier 9 assumes a position corresponding to the full-line position of the carrier 15. The carrier 9 then moves along a horizontal third section of the endless path (arrow 30) and entrains the filled storing device 11 onto the rear platform 24. When the carrier 9 reaches the end of the lower horizontal path section, it assumes a position corresponding to the phantom-line position 15' of FIG. 3 in which the carrier 9 rests on the rear platform 24 and is ready to be lifted along a vertical fourth section of the endless path (arrow 31) to return to the full-line position of FIG. 3. In the final step, the carriage 4 returns the filled container 11 onto the magazine 160 (arrow 10b) when the respective carriage is located at the junction of the first and fourth path sections (arrows 28, 31).

The second carrier 15 moves in the same direction and in the same endless path in the following manner: When the carrier 9 advances to its phantom-line position 9' (arrow 28), the carrier 15 advances to its phantom-line position 15' (arrow 30) and, when the carrier 9 descends along the transfer station 14 (arrow 29), the carrier 15 rests on the rear platform 24 and is lifted along the fourth section of the endless path (arrow 31). The carrier 15 is now in a position in which the filled coverless tray 16 is ready to be engaged by the carriage 4 and to return onto the magazine 160 (arrow 10b). The carrier 15 then receives an empty storing device and advances along the upper horizontal section of the endless path (arrow 28) while the carrier 9 moves along the lower horizontal section (arrow 30). In other words, the two carriers circulate in the same direction but are sufficiently spaced from each other to avoid collision, i.e., one of the carriers trails behind and is spaced from the other carrier.

It will be noted that the point (i.e., the junction of the first and fourth path sections) at which storing devices are delivered into or withdrawn from the carriages 9, 15 is located upstream of the second path section (arrow 29) so that a carrier entering the second path section and beginning to descend along the transfer station always accommodates an empty storing device.

Figure 4:
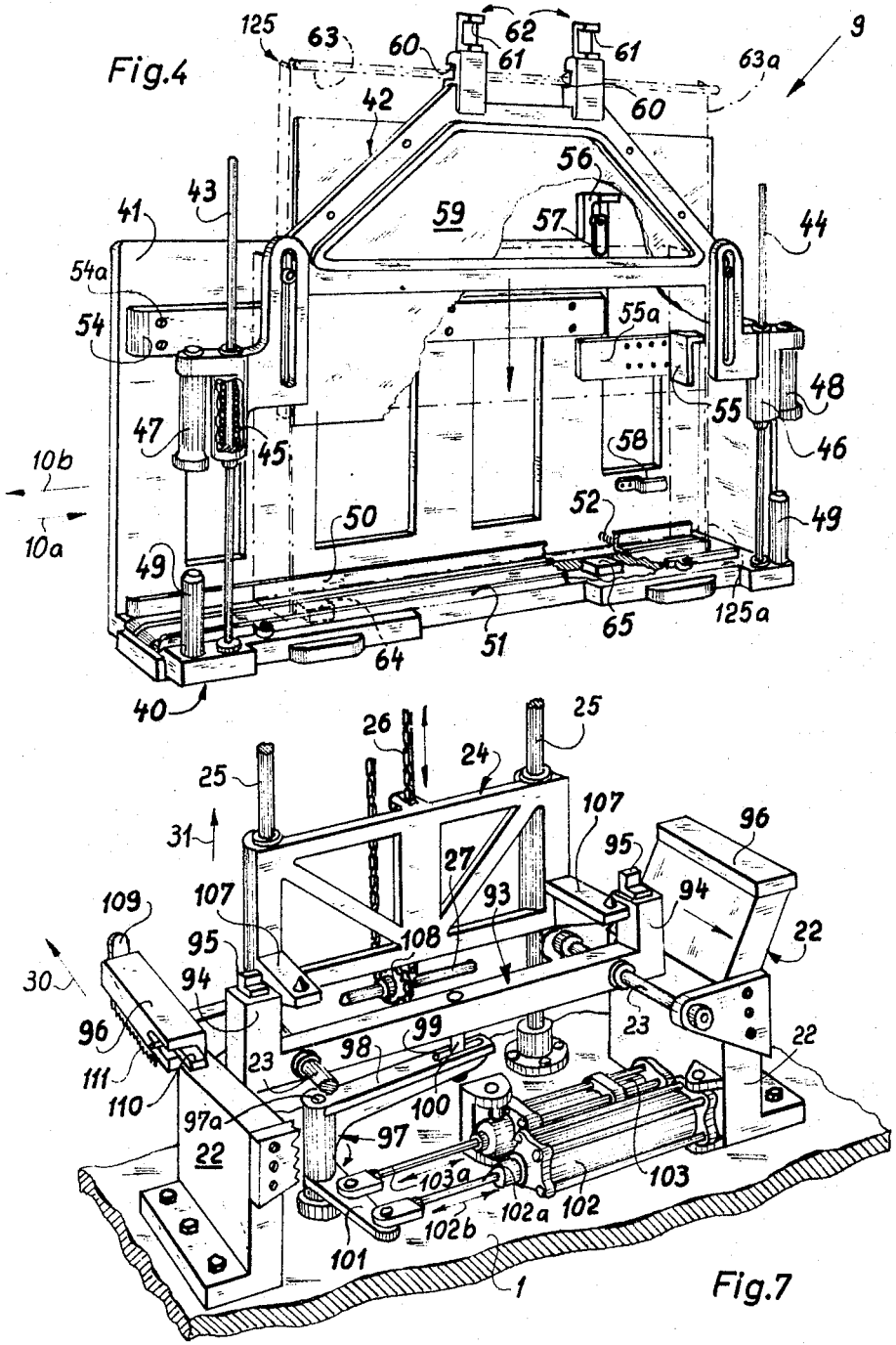
FIG. 4 is a perspective view of a carrier.

FIG. 4 illustrates the details of the carrier 9, and it is assumed that this carrier is provided with a cover, i.e., with a front wall 42 which is reciprocable in a vertical plane. The cover 42 may be detached from the remaining component parts of the carrier 9 if the nature of articles stored in the device 125 accommodated in this carrier is such that the cover may be dispensed with.

The carrier 9 comprises an elongated bottom wall 40 which is disposed in a horizontal plane, a vertical rear wall 41 whose front side extends upwardly from the upper side of the bottom wall 40, and the aforementioned cover or front wall 42. The cover 42 is reciprocable in its own vertical plane in a manner similar to that of the cover forming part of a storing device which is fully described in the aforementioned application Ser. No. 208,737 of Rudszinat et al. The bottom wall 40 supports a pair of upwardly extending guide members or rods 43, 44 for reciprocable bearing sleeves 45, 46 which form part of or which are attached to the cover 42. The sleeves 45, 46 are respectively connected with the cylinders of shock absorbers 47, 48 whose piston rods may extend into aligned cylinders 49 secured to the bottom wall 40.

The upper side of the bottom wall 40 supports two elongated clamping or retaining rails 50, 51 which extend along the full length and are parallel with the longitudinal extension thereof, and the rail 50 is biased by resilient means here shown as helical springs 52 so that it tends to move toward the rail 51. Suitable means (such as screws or the like) are provided for facilitating adjustments in the position of the rail 51 with respect to the rail 50. The distance between these rails is selected in such a way that it is normally somewhat less than the width of the bottom wall forming part of a storing device 125 which is shown in phantom lines, whereby the springs 52 are compressed and clamp the bottom wall of the storing device between the rails 50, 51 when the storing device assumes the position of FIG. 4 so that the storing device 125 is held against movements at right angles with respect to the longitudinal extension of the bottom wall 40. The bottom wall of the storing device is preferably of constant width.

The rear wall 41 of the carrier 9 supports a horizontal strip or batten 54 which is mounted in such a way that the storing device 125 remains in upright position when its bottom wall is introduced between the rails 50, 51, i.e., the batten 54 serves as a spacer which maintains the outer side of the rear wall of the storing device 125 at a predetermined distance from the rear wall 41. The position of the batten 54 is adjustable by screws 54a so that the carrier 9 may take different types of storing devices.

The batten 54 extends along the major part of the front side of the rear wall 41 and terminates at a stop here shown as a lug 55 which is adjustably secured to the front side of the wall 41 by screws 55a and which abuts against the right-hand side wall 125a of the storing device 125 when the latter is properly introduced into the carrier 9.

At a point substantially above the stop 55, there is provided a bracket 56 which is secured to the front side of the rear wall 41 and which supports a freely swingable retaining lever 57 whose pivot is located above and whose lower end normally extends below the upper edge of the storing device 125. This lever 57 serves as a means for holding the storing device against tilting, i.e., against movements away from the batten 54, and is rocked by the righthand side wall 125a of the storing device when the latter is caused to enter the carrier 9 in a direction indicated by the arrow 10a.

At a point below the stop 55, the front side of the rear wall 41 supports a resilient element here shown as a flat spring 58 whose free end engages the outer side of the rear wall of the storing device 125 and prevents the latter from rattling in the carrier 9. The spring 58 holds the storing device by friction, and it will be noted that this spring engages the storing device at a time when the storing device is already engaged by the lever 57 and when the right-hand side wall 125a of the storing device approached the stop 55.

The upper edge portion of the cover 42 carries two spaced blocks 62 each of which is provided with two cutouts or recesses 60, 61 whose purpose will be described in greater detail in connection with FIG. 6. As shown in FIG. 4, the recesses 60 which open toward the front side of the rear wall 41 receive a horizontal rib or bead 63 constituting the upper edge portion of a vertically reciprocable front wall or cover 63a which forms part of the storing device 125. The cover 42 comprises a readily detachable panel 59.

The underside of the bottom wall 40 carries two spaced blocks 64, 65 adapted to cooperate with that portion of the advancing means which moves the carrier 9 along the lower horizontal section of its endless path (arrow 30 in FIG. 3).

The construction of the carrier 15 is identical with that of the carrier 9.

FIG. 5 illustrates in greater detail one of the spring-biased guide brackets 12 and one of the motion transmitting brackets 13, the latter serving as a means for advancing the carriers along the upper horizontal section of the endless path, i.e., in a direction as indicated in FIG. 3 by the arrow 28. Since the other of each pair of brackets 12, 13 is of identical construction, only one of each of these brackets is shown in FIG. 5. The brackets 12 supportingly engage and guide the carriers at the time these carriers complete their upward movement along the fourth section of the endless path (arrow 31 in FIG. 3) and remain in supporting engagement with and guide the carriers while the carriers begin to move in the direction of arrow 28.

The bracket 12 is mounted on a shaft 34 which is supported by a forwardly extending arm 32 forming part of the frame 2. A spring 33 which operates between the bracket 12 and the arm 32 tends to pivot the bracket into the path of an ascending carrier 9 or 15, i.e., into the fourth path section (arrow 31 in FIG. 3). The upper face of the bracket 12 is formed with an elongated channel 37 which receives the adjacent transverse edge portion of the bottom wall 40 when the bracket 12 supportingly engages the carrier 9 or 15. The arm 32 comprises journals for two reciprocable horizontal guide rods 38, 39 fixed to an L-shaped blocking member 66 which is displaceable with these rods by the downwardly extending arm of a bell crank lever 67 when the lever is rocked clockwise, as viewed in FIG. 5. The lever 67 is rockable by the piston rod of a pneumatic cylinder 68. The blocking member 66 is alignable with the channel 37 and then abuts against the adjacent side and bottom walls of the carrier 9 when the latter advances from the bracket 12 into a position above the front platform 17 (arrow 28). A spring 69 which operates between the lower arm of the lever 67 and the arm 32 tends to bias the blocking member 66 against the carrier 9, i.e., into alignment with the channel 37.

The arm 32 also supports a bearing for the shaft of a sprocket 70 for one of the chains 19 and two horizontal guide rods 71, 72 for the motion transmitting bracket 13. The latter comprises a push plate 73 which may engage the outer side of the rear wall 41 and which is secured to an arm 74 forming part of an inverted L-shaped holder 75 which is slidable along the guide rods 71, 72 and which comprises a suitably configured downwardly extending lug 76 engaging an endless chain 77 which is trained around a sprocket 78. This sprocket is alternately driven in clockwise and anticlockwise directions (arrow 78b) so that the chain 77 may entrain the lug 76 and the push plate 73 forwardly (arrow 28) in order to move the carrier 9 to the phantom-line position 9' of FIG. 3, or rearwardly in order to return the push plate 73 to the position of FIG. 5 in which the push plate may engage the rear wall 41 of the other carrier 15.

It will be noted that the guide rods 38, 39 and 71, 72 are respectively parallel with the arrows 10a and 28.

Referring now to FIG. 6, there is shown a mechanism which maintains the cover 42 of a carrier (e.g., the carrier 9) in raised position while the carrier descends along the transfer station 14. This mechanism assumes the form of an attachment having a horizontal bar 81 which is detachably secured to brackets 35 by screws or bolts 81a. The bar 81 supports a vertical plate 81b which is formed with vertical slots 81c for retaining screws 81d which are screwed into the bar 81 so that the plate 81b may be adjusted vertically in its own plane if desired. The lower portion of the plate 81b carries two forwardly extending L-shaped brackets 82 which are secured thereto by bolts 82a and whose forwardly extending legs carry horizontal pivot pins 83 for a pair of U-shaped retaining levers 84. The levers 84 are rigidly connected to each other by a horizontal rod 85 and tend to pivot in an anticlockwise direction, as viewed in FIG. 6, under the pull of helical springs 86 having ends connected to the rod 85 and to the horizontal flange of an L-shaped bracket 87 which is bolted to the plate 81b. In other words, the rod 85 is biased upwardly and toward the horizontal flange of the bracket 87. This bracket 87 supports a pneumatic cylinder 88 whose piston rod 89 extends downwardly and abuts against the rod 85, i.e., the piston rod 89 extends through and is slidable with respect to the horizontal flange of the bracket 87.

FIG. 6 illustrates a portion of a cover 42 with blocks 62 each of which supports a freely swingable retaining lever 90 adapted to engage the inner side of a cover 63a whose horizontal upper edge portion or rib 63 is received in the recesses 60. The recesses 61 receive the hook-shaped end portions of the respective levers 84. The manner in which the attachment of FIG. 6 retains the covers 42, 63a will be described in greater detail in connection with FIGS. 12a and 12b.

The blocks 62 and the levers 90 together constitute a connecting means for automatically engaging the cover 63a of that storing device which is accommodated in the carrier so that the cover 42 retains the cover 63a against movement with the respective storing device while the carrier advances along the transfer station 14.

FIG. 7 illustrates that portion of the advancing means which causes the carriers 9, 15 to move along the lower horizontal section (arrow 30) and along the fourth and last section (arrow 31) of the endless path shown in FIG. 3. The guideways 22 carry two spaced horizontal guide rods 23 for a trolley 93 having two opposite longitudinal ends each of which is provided with an upwardly extending column 94, and each of these columns carries at its upper end a motion transmitting bracket or lug 95 which projects upwardly and beyond the upper faces of two horizontal rails 96 secured to or forming part of the guideways 22. The rails 96 are provided at the upper ends of the respective guideways 22, and the space between these guideways accommodates a specially configurated lever 97 which is rockable about a vertical shaft 97a secured to the base plate 1 and which comprises a horizontal upper arm 98 having an elongated slot 99 for a downwardly extending pin 100 secured to the trolley 93 so that the trolley reciprocates along the guide rods 23 when the lever 97 is rocked about the axis of the shaft 97a. The lower arm 101 of the lever 97 makes right angles with the arm 98 and is articulately connected with the piston rod 102a of a horizontal pneumatic cylinder 102 and with the piston rod 103a of a horizontal shock absorber 103, both mounted on the base plate 1.

The rear platform 24 is somewhat smaller than the front platform 17, and its width is less than the distance between the columns 94. This rear platform 24 is reciprocable along the guide rods 25 and comprises an upstanding rear wall or panel which is suspended at one end of the aforementioned chain 26, this chain being trained around a sprocket 108 mounted on the shaft 27. The rear platform 24 further comprises two forwardly extending arms 107 which are located at a level below the rails 96 when the platform 24 is moved to its lowermost position.

When the cylinder 102 expels its piston rod 102a (arrow 102b), the upper arm 98 of the lever 97 is rocked in a clockwise direction, as viewed in FIG. 7, and the trolley 93 moves forwardly to assume a position in which it may receive a carrier with a storing device after the storing device has been filled while descending with its carrier along the transfer station 14. If the piston rod 102a is retracted, the upper arm 98 moves to the position of FIG. 7 and entrains a filled storing device with one of the carriers 9, 15 so that the carrier assumes a position corresponding to the phantom-line position 15' of the carrier 15 shown in FIG. 3 and is supported by the platform 24.

The left-hand rail 96, as viewed in FIG. 7, supports an upwardly extending reciprocable stop 109 which is shown in greater detail in FIG. 8. This stop forms part of a pusher or slide bar 110 which is biased by a spring 111 tending to maintain the stop 109 in abutment with the rear end face of the rail 96. The front end portion of the pusher 110 projects beyond the rail 96 into the path of a wedge-shaped cam 112 which is secured to the rear face of the front platform 17. The platform 17 supports a second cam 113 which is adjacent to the cam 112 and which serves as a trip to actuate a control valve 114 when the platform 17 descends or ascends along the transfer station 14 (arrows 29, 29a).

FIG. 9 illustrates in greater detail the coupling 5 which serves as a means for selectively connecting the carriage 4 with the chain 8 so that the carriage may entrain an empty storing device 125 in a direction to the left, as viewed in FIG. 9 (i.e., to the right, as viewed in FIG. 2 and as indicated by the arrow 10a). The crosshead 3 carries a plate 115 for a pneumatic cylinder 122 whose downwardly extending piston rod 121 is adjustably secured to a coupling head 120. The lower portion of the plate 115 carries a horizontal pivot pin 116 for a two-armed lever 117, and each arm of this lever carries a roller 118, 119, respectively, the roller 119 extending into an elongated slot 120a provided in the coupling head 120. The pin 116 is located at a level below the lower run of the chain 8 which is trained around a sprocket 123 adjustably mounted at one end of the crosshead 3, i.e., at that end of the crosshead which is nearer to the magazine 160. The lower run of the chain 8 moves in a direction indicated by the arrows 10a. The upper end of the carriage 4 comprises journal bearings which are slidable along two horizontal guide rods 4a (see also FIG. 6) which extend in the longitudinal direction of the crosshead 3. As shown in FIG. 9, the carriage 4 is provided with a rotatable pin 128 which extends forwardly and rearwardly of the carriage and which is rigidly connected with two coupling members 126, 127 the former of which is adapted to cooperate with the chain 8 to entrain the carriage in a direction as indicated by the arrow 10a and the latter of which may cooperate with the chain 7 to entrain the carriage in the opposite direction (arrow 10b). The bifurcated end portion of the coupling member 126 rests on the roller 118, and the distance between the roller 118 and chain 8 is sufficient to permit the coupling member 126 to assume a position in which it is detached from the lower run of the chain 8.

The construction of the other coupling 6 is identical to that of the coupling 5 with the exception that the lever 117a of the coupling 6 (FIG. 2) is located below the lower run of the chain 7. The couplings 5, 6 and the carriage 4 form part of that portion of the advancing means which moves the storing device 125 toward and away from the magazine 160, i.e., in the longitudinal direction of the crosshead 3. The carriage 4 comprises a U-shaped entraining element or fork 124 which is rotatable about a horizontal pin 124a and which automatically enters into an empty storing device after being pivoted by the cover of such storing device while the magazine 160 advances forwardly (arrow 160a in FIG. 1). The storing device 125 of FIG. 9 is provided with a vertically movable cover 63a and is moved in a direction as indicated by arrow 160a when the magazine 160 advances along the circulating apparatus. When the carriage 4 assumes the position of FIG. 1 or 9, the fork 124 is aligned with the adjacent side wall 125a of the empty storing device 125 in such a way that the upper edge of the side wall 125a enters into the slot 124b of the fork 124 when the magazine 160 advances along the circulating apparatus. When the fork 124 entrains the empty storing device 125 to the phantom-line position 11 of FIG. 2, and when the carriage 9 is thereupon caused to advance in a direction as indicated by arrow 28, the fork 124 is automatically detached from the side wall 125a because it is pivoted upwardly by the rear wall 125b to thereupon descend by gravity back to the position of FIG. 9 in which it is ready to engage the side wall of a filled storing device about to return to the magazine 160.

FIG. 10 illustrates that portion of the advancing means which controls movements of the front platform 17 along the transfer station 14 during which the storing device accommodated in the carrier 9 or 15 is gradually filled with rows of cigarettes Z. Such movements of the front platform 17 are controlled by a pair of pneumatic cylinders 129, 145 which cooperate with a brake mechanism 130 including a ratchet wheel 132 mounted on a horizontal shaft 132a, the latter also mounting the sprocket 70 for one of the chains 19. The shaft 132a is mounted in two bearing brackets 2b which are secured to the frame 2. FIG. 10 shows only one of these bearing brackets, and FIG. 2 shows that the shaft 132a supports a second sprocket 131 for the right-hand chain 19. The ratchet wheel 132 cooperates with two pawls 133, 134 respectively mounted on blocks 133a, 134a which are carried by a vertical shaft 135. The upper block 134a is biased by a spring 144 and is provided with a vertical slot 136 for a pin 137 which is secured to the shaft 135 so that the spring 144 normally tends to maintain the pin 137 close to the upper end of the slot 136 whereby the underside of the block 134a abuts against a stop collar 138 which is rigidly fixed to the shaft 135. Both ends of the shaft 135 are axially movably mounted in the frame 2, and it will be noted that the upper end of the spring 144 bears against a fixed journal 141a for the upper end of the shaft 135. This journal forms part of a bracket 141. The block 134a is connected with the tip of a motion transmitting stud 139 which is reciprocable in a vertical bore of the bracket 141 and whose head 140 may cooperate with the lower flange of an L-shaped retaining member 143 which is secured to and is reciprocable by the piston rod 129a of the cylinder 129. The piston rod 129a is slidably guided by a horizontal bar 129b mounted on the bracket 141 so that, when the piston rod 129a moves to the left, as viewed in FIG. 10, and the head 140 of the stud 139 is lifted, the member 143 enters between the bracket 141 and the head 140 and retains the pawl 134 away from the teeth of the ratchet wheel 132.

The lower block 133a is biased downwardly by a helical spring 142 which is connected to the frame 2 and which tends to hold the lower pawl 133 away from the teeth of the ratchet wheel 132. Since the shaft 135 is rigidly connected with the block 133a, this shaft is also subjected to the bias of the spring 142 and normally assumes its lowermost position.

The pawls 133, 134 are positioned in such a way that, when the pawl 134 engages a selected tooth 132d of the wheel 132, the other pawl 133 is spaced from and is located substantially midway between a pair of teeth 132b, 132c. The angular distance between a pair of adjacent teeth on the ratchet wheel 132 approximates the diameter of a filter tip cigarette Z and, therefore, whenever the ratchet wheel is permitted to rotate through such angular distance, the front platform 17 descends sufficiently to permit transfer of a newly assembled row of cigarettes onto the uppermost row of cigarettes already accommodated in that storing device which is momentarily supported by the platform 17 while the latter descends in a stepwise fashion along the transfer station 14. When the lower pneumatic cylinder 145 expels its piston rod 145a in upward direction, the piston rod lifts the shaft 135 to disengage the upper pawl 134 from the tooth 132d and to move the lower pawl 133 into engagement with the tooth 132b. When the collar 138 abuts against the upper block 134a and begins to move the upper pawl 134 away from the tooth 132d, the lower pawl 133 is already in a position in which it is in the path of the tooth 132b in order to engage this tooth shortly before the tooth 132d is released whereby the ratchet wheel 132 is held against uncontrolled rotation such as would cause the platform 17 to move beyond a position in which the storing device could receive a new row of cigarettes. During such upward movement of the pawl 133, the wheel 132 is permitted to turn through an angular distance which corresponds to half the distance between the pawl-engaging faces of two adjacent teeth. As the block 134a is caused to move upwardly, it lifts the head 140 of the stud 139 above the level of the lower flange of the retaining member 143 so that, and if the cylinder 129 is actuated in a sense to move its piston rod 129a in a direction to the left, as viewed in FIG. 10, the lower flange of the member 143 may enter between the head 140 and bracket 141 to maintain the stud 139 in lifted position. Consequently, the pawl 134 is then maintained out of engagement with the ratchet wheel 132 and the latter may rotate to permit rapid descent of the platform 17 provided, of course, that the lower pawl 133 is also withdrawn to assume its inoperative position. The stud 139 assumes such raised position at the time the storing device supported by the platform 17 has already received a requisite supply of cigarettes and is ready to descend with its carrier 9 or 15 in order to assume a position corresponding to the full-line position of the carrier 15 and to the broken-line position of the storing device 16 in FIG. 2.

However, when the storing device is caused to descend along the transfer station 14 and receives consecutively assembled rows of cigarettes Z, the cylinder 129 is not actuated and maintains its piston rod 129a in the position of FIG. 10 so that the head 140 of the stud 139 may descend into abutment with the bracket 141. The cylinder 145 receives and discharges compressed air at spaced intervals so that it cooperates with the spring 142 to bring about reciprocatory movements of the shaft 135. Whenever the cylinder 145 discharges compressed air, the spring 142 returns the shaft 135 to its lowermost position together with the lower pawl 133 which is then disengaged from the wheel 132 and the latter is free to turn through an angular distance corresponding to half the distance between two adjacent teeth before the upper pawl 134 engages the next tooth of the wheel 132. Thus, a combined upwardly and downwardly oriented movement of the shaft 135 is necessary to advance the wheel 132 through an angular distance sufficient to lower the front platform 17 through a distance approximating the diameter of a cigarette.

FIG. 1 shows the platform 17 in a position it assumes at the time an empty or a partly filled storing device accommodated in the carrier 9 (which is assumed to be supported by the platform 17) descends along the transfer station 14 and receives consecutively assembled rows of cigarettes Z which are transferred into its interior by the element 150. On the other hand, the storing device 16, the carrier 15 and the front platform 17 of FIG. 2 have already descended below the transfer station 14, and the other carrier 9 is about to move the empty storing device 11 to a position in which the empty storing device will be caused to descend with the platform 17 along the transfer station after the platform 17 returns to its uppermost position under the action of counterweights 20 and cylinder 158.

Figure 11:
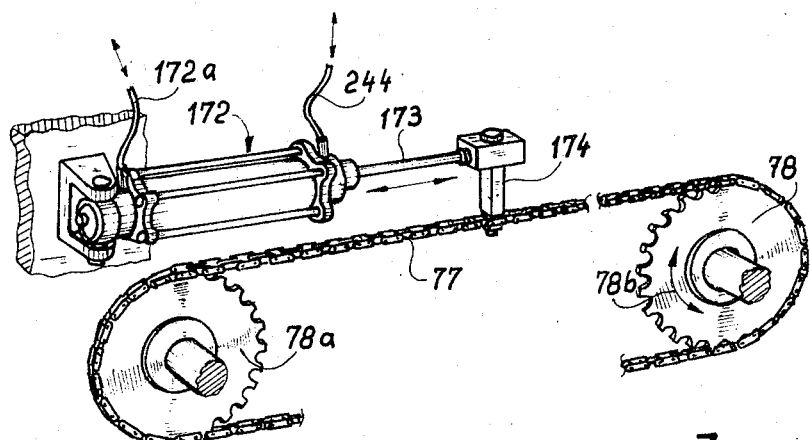
FIG. 11 is a perspective view of a double-acting pneumatic cylinder which is utilized for reciprocating an endless chain forming part of the structure shown in FIG. 5.

FIG. 11 illustrates the manner in which a double-acting pneumatic cylinder 172 cooperates with the endless chain 77 of FIG. 5 to reciprocate the push plate 73 back and forth along the upper horizontal section of the endless path for the carriers 9 and 15. The piston rod 173 of the cylinder 172 carries a coupling element 174 which is fixed to the upper run of the chain 77 and which is movable back and forth, depending upon whether the cylinder 172 receives compressed air through a first supply conduit 172a or through a second supply conduit 244. The stroke of the piston rod 172 corresponds to the distance between the two end positions of the push plate 73. The cylinder 172 is mounted on the frame 2, and the chain 77 is trained around the aforementioned sprocket 78 (FIG. 5) and about a second sprocket 78a which is shown in FIG. 11 and which is also mounted in the frame 2. The chain 26 for the rear platform 24 is reciprocable in similar fashion by a cylinder 256 (see FIG. 12b).

Of course, instead of utilizing a lug such as the lug 76 of FIG. 5, the chain 77 may transmit motion in a different way, for example, through the shaft of the sprocket 78 or 78a, if desired. Thus, the shaft of the sprocket 78a may be connected with a pinion whose teeth mate with the teeth of a rack which is secured to the holder 75. This modification is so obvious that it can be readily comprehended by skilled mechanics without additional illustrations.

FIGS. 12a and 12b illustrate a pneumatic control system for the circulating apparatus of our invention and for certain other parts of the cigarette making machine. The elements whose movements are controlled by this pneumatic system are identified by reference numerals identical with those utilized in FIGS. 1 to 11. The showing of FIGS. 12a and 12b is schematic and certain elements, such as the platform 17, are shown more than once for better understanding of the manner in which the machine functions. The arrangement of various valves and conduits is selected in such a way that the conduits are as short as possible in order to insure that the cylinders are actuated with little delay and that air pressure in the conduits may rise or drop instantaneously when a change in air pressure becomes necessary.

Before proceeding with a detailed description of the operation, we will shortly describe the layout of the elements which are shown in FIGS. 12a and 12b so that the operation of the machine may be more readily understood with reference to FIGS. 1–11 and/or to FIGS. 12a and 12b.

In the upper portion of FIG. 12a, there is shown the lifter 151 of FIGS. 1 and 2, as well as one (154) of the levers which control movements of the lifter 151 toward and away from the upper run of the take-off conveyer 512. In its full-line position, the lifter 151 is adjacent to the conveyer 512 and assembles a row of cigarettes Z which beings to form at the left-hand end thereof, as viewed in FIG. 12a, because the upper run of the conveyer 512 is assumed to move to the left as indicated by the arrow 512a. The lifter assumes a raised position 151' (shown in phantom lines) when the lever 154 is rocked in an anticlockwise direction, and the newly assembled row of cigarettes Z is then coplanar with the transferring element 150 which assumes a phanton-line position 150' at the time it has transferred a newly assembled row of cigarettes into the storing device 125 accommodated in the carrier 9 (see the position 9u of this carrier in FIG. 12b). The means for reciprocating the transferring element 150 between its full-line and phantom-line positions includes the previously mentioned lever 221 and the pneumatic cylinder 147 which is of the double-acting type and whose operation is synchronized with the operation of the double-acting cylinder 152 for the lifter 151. The element 150 is reciprocable in a horizontal plane.

The operation of the cylinders 147, 152 is regulated by a series of main valves 210, 211, 218, 225 which are shown in the lower portion of FIG. 12a.

Adjacent to the right-hand end of the lifter 151, there is shown the brake mechanism 130 of FIG. 10 which controls the pawls 133, 134 to regulate movements of the front platform 17 along the transfer station 14. This platform is shown in FIG. 12b in a series of positions including a lowermost position (full lines at 17), an intermediate position (phantom lines 17') and an uppermost position (phantom lines 17''). It is assumed that the platform 17 supports the carrier 9. As explained in connection with FIG. 10, the pawls 133, 134 are controlled by two pneumatic cylinders 129, 145 the former of which permits uninterrupted descent of the platform 17 at the time the storing device 125 accommodated in the carrier 9 is filled with cigarettes, and the latter of which permits stepwise movements of the platform 17 along the transfer station 14. The cylinders 129, 145 are controlled by a main valve 235 shown in FIG. 12a. The left-hand portion of FIG. 12b shows that the platform 17 engages the carrier 9 below the blocking members 66 which are reciprocable by pneumatic cylinders 68 through bell crank levers 67.

The pneumatic system of FIGS. 12a and 12b further comprises a series of control valves 294, 276 and 114 which are shown in FIG. 12b adjacent to the left-hand end of the platform 17, as well as a further control valve 247 which is located below this platform. The valves 294, 276, 114 and 247 respectively cooperate with the cylinder 145 of the brake mechanism 130, with the cylinder 88 of FIG. 6, with the cylinder 129, and with the cylinder 102 in the same order. The cylinder 102 is shown in FIG. 12b adjacent to the right-hand end of the front platform 17.

The upper portion of FIG. 12b illustrates the carriage 4 and the advancing means therefor including two control valves 258, 164 which cooperate with the coupling members 126, 127 and with the mechanism 159 the latter shown in the lower right-hand portion of FIG. 12b and including the aforementioned pneumatic cylinder 161. The cylinder 172 of FIG. 11 is shown between the cylinder 102 and the carriage 4, i.e., to the right of the right-hand blocking member 66, as viewed in FIG. 12b. This cylinder 172 serves as a means for moving the brackets 13 along the upper horizontal section of the endless path (arrow 28 in FIG. 3) for the carriers 9 and 15.

The cylinder 88 controls the cover retaining means of FIG. 6, and the cigarette making machine further comprises a guide device 280 (shown in FIG. 12b adjacent to the cylinder 88) which reciprocates into or out of a storing device as will be described hereinafter.

Main valves 238 (FIG. 12a), 255, 242, 277 and 251 (FIG. 12b) control movements of coupling members 126, 127, of the mechanism 159, of the brackets 13, of the cylinder 88 and of the guide device 280.

In accordance with a feature of our invention, the pneumatic control system of FIGS. 12a and 12b is preferably assembled in two groups one of which (including the main valves 210, 211, 218, 225, 235 of FIG. 12a) is assembled in a first casing and the other of which (including the main valves 238, 255, 242, 277, 251) is assembled in a second casing. Such subdivision of the pneumatic system into two distinct groups renders it possible to place the valves in close proximity of the elements controlled thereby and to shorten the conduits to such an extent that the pneumatic system can achieve substantial savings (up to 30 liters/min.) in compressed air which could not be achieved if all components of the pneumatic system were placed into a common casing.

The main valves preferably assume the form of so-called distributing valves whose valve members are capable of controlling the flow of compressed air into and/or from two or more conduits.

We will now proceed to describe the operation of the circulating apparatus in two parts the first of which will be made with reference to FIGS. 1 to 11 and the second of which will refer mainly to FIGS. 12a and 12b.

As shown in FIG. 9, the U-shaped entraining fork 124 engages an empty storing device 125 (shown in phantom lines at 125' in FIG. 12b) while this storing device is still supported by the magazine 160 (FIG. 1). The carriage 4 is assumed to be in its leftmost position, as shown in FIG. 1, whereby the fork 124 is automatically located in the path of the side wall 125a forming part of the foremost empty storing device 125 so that, as the mechanism 159 advances the magazine 160 through a distance substantially corresponding to the thickness of a storing device, the cover 63a of the empty storing device 125 pivots the fork 124 anticlockwise, as viewed in FIG. 9, until the right-hand leg 124c of this fork is free to descend by gravity into the interior of the storing device. The upper edge portion of the side wall 125a is now accommodated in the slot 124b and the storing device is compelled to move in a straight path and longitudinally of the cross-head 3 because it is operatively coupled to the carriage 4. Of course, if the storing device 125 is of the type which is without a cover 63a, the engagement between the side wall 125a and the fork 124 is much simpler because the fork need not even pivot at the time the magazine 160 advances in order to move the empty storing device into alignment with the crosshead 3.

In an immediately following step, the control system of the circulating apparatus admits compressed air to the upper chamber of the cylinder 122 so that the piston rod 121 moves downwardly and rocks the lever 117 in a clockwise direction, as viewed in FIG. 9, whereby the roller 118 compels the coupling member 126 to engage a selected pintle of the constantly driven chain 8 which entrains the carriage 4 and the empty storing device into the circulating apparatus so that the storing device assumes the full-line position 125 of FIG. 12b. The coupling member 127 remains disconnected from the chain 7 because it is rigidly connected to the pin 128 and is caused to move away from the chain 7 when the coupling member 126 engages the chain 8. In other words, the carriage 4 cannot be connected with the chain 7 when the coupling member 126 engages with and is entrained by the chain 8, or vice versa.

The carriage 4 is automatically arrested when the coupling member 127 reaches the lever 117a of the coupling 6 (see FIG. 2). The lever 117a is then in such position that it disengages the coupling member 126 from the chain 8 without, however, immediately coupling the member 127 to the chain 7, i.e., the carriage 4 and the empty storing device 125 are arrested in a position substantially centrally of the cross head 3. The carriage 4 is returned to the position of FIG. 9 at a time when the pneumatic cylinder 122a of the coupling 6 (see FIG. 12b) is actuated to rock the lever 117a to the extent necessary to move the coupling member 127 into actual engagement with the chain 7 whose lower run is constantly driven by the motor 36 in a direction to move the carriage back toward the magazine 160 (arrow 10b).

The coupling member 127 is caused to engage the chain 7 at a time when the rear platform 24 lifts a newly filled storing device into the position 11 of FIG. 2. The side wall 125a of such filled storing device automatically enters the slot 124b of the fork 124 since the latter tends to assume the position of FIG. 9 by the action of gravity and because the side wall 125a of a filled storing device moves upwardly so that the fork 124 need not be tilted to accommodate the upper edge portion of such side wall. As soon as the slot 124b receives the upper edge portion of the side wall 125a forming part of a newly filled storing device, the pneumatic system of the circulating apparatus transmits a suitable impulse to the pneumatic cylinder 122a of the coupling 6 so that the cylinder rocks the lever 117a and causes the coupling member 127 to engage the lower run of the chain 7 which thereupon entrains the filled storing device in the aforementioned straight path and back onto the magazine 160 (arrow 10b) to fill the space previously occupied by the storing device 125. During such return movement of the carriage 4 toward the magazine 160, the fork 124 actually pushes the filled storing device in front of itself whereas, when an empty storing device is to be moved into the circulating apparatus, the empty storing device trails the fork 124 because the latter then advances to the left, as viewed in FIG. 9, to drag the empty storing device onto the carrier 9 or 15.

When a filled storing device returns onto the magazine 160, the lever 117 assumes the position of FIG. 9 (because the cylinder 122 has permitted its spring-biased piston rod 121 to return in upward direction) so that the roller 118 engages the coupling member 126 and causes the other coupling member 127 to become disconnected from the chain 7. Thus, the carriage 4 is arrested at the time the filled storing device has returned onto the magazine, whereupon the magazine again advances through a predetermined distance (arrow 160a in FIG. 1) to move the side wall of the next empty storing device into the slot 124b.

An empty storing device 125 which has been entrained into the circulating apparatus automatically enters the carrier 9 (FIGS. 2 and 4) in the following manner: The carrier 9 is assumed to be supported by the rear platform 24 which is in its uppermost position, or by the brackets 12. As the empty storing device 125 advances with the carriage 4 which is coupled to the lower run of the chain 8, the lower edge portion of the side wall 125a enters between the rails 50, 51 and moves the rail 50 against the bias of the springs 52 so that the bottom wall of the storing device is frictionally engaged by these rails and is properly guided with respect to the carrier 9. The side wall 125a then reaches the lever 57 and the latter yields by pivoting upwardly to permit passage of the side wall and to thereupon descend by gravity to the position of FIG. 4 or 6 in which it engages the inner side of the rear wall 125b and holds the empty storing device 125 against the batten 54. As the storing device 125 continues to advance toward the stop 55 of the carrier 9, it engages and deforms the spring 58 which causes its rear wall 125b to bear against the lever 57. Once the side wall 125a abuts against the stop 55, the storing device 125 is properly held against all possible displacements by being subjected to the bias of springs 52 and 58 and by being additionally engaged by the batten 54 and lever 57. The adjustability of the batten 54 and of the front rail 51 enables the carrier 9 to accommodate different types of storing devices, i.e., the storing devices may be of different depths depending on the length of cigarettes which are being stored therein. The bias of springs 52 and 58 is selected in such a way that the storing device is held against vibration and is capable of maintaining its position in spite of shocks to which it might be subjected while advancing in the endless path defined by the circulating machine.

Since the storing device 125 comprises a cover 63a, and since the carrier 9 also comprises a cover 42, the circulating apparatus must be provided with the attachment of FIG. 6 which maintains the covers 42, 63a in raised position in the following manner:

The horizontal edge portion 63 at the upper end of the cover 63a automatically enters the cutouts 60 of the blocks 62 when the storing device 125 enters the circulating apparatus by advancing with the lower run of the chain 8. Even before the edge portion 63 enters the cutouts 60, the side wall 125a of the storing device 125 swings the levers 90 out of its path whereupon the levers 90 descend by gravity to engage the inner side of the cover 63a whereby the edge portion 63 is retained in the cutouts 60 and is coupled to the cover 42. The cover 42 is suspended on the brackets 35 of the crosshead 3 because the recesses 61 of the blocks 62 accommodate the hook-shaped end portions of the retaining levers 84 which are carried by the brackets 82.

FIG. 6 illustrates the carrier 9 and the empty storing device 125 in a position they assume when the carrier has already advanced along the upper horizontal section of its endless path (arrow 28 in FIG. 3) and is located above the front platform 17. Such forward movement of the carrier 9 is effected by the motion transmitting brackets 13 which are moved by chains 77 (see FIGS. 2, 5 and 11). While advancing with the brackets 13, the bottom wall of the carrier 9 slides onto the blocking members 66 which are biased by springs 69 so as to assume positions corresponding to that of the blocking member 66 shown in FIG. 5 in which this blocking member is aligned with the channel 37 of the associated guide bracket 12. The retaining levers 84 enter the respective recesses 61 in a fully automatic way when the carrier 9 assumes a position corresponding to the position 9' of FIG. 3 because the hook-shaped end portions of the levers 84 are located in the path of the recesses 61 when the carrier 9 advances in a direction as indicated by the arrow 28. In other words, the edge portion 63 is automatically coupled to the cover 42 at the time the empty storing device 125 enters the circulating apparatus, and the cover 42 is automatically coupled to the crosshead 3 (that is to say, to the levers 84 which are carried by the brackets 35 of the crosshead) at the time the carrier 9 has completed its advance along the upper horizontal section of its endless path and is ready to descend with the front platform 17 to move the empty storing device along the transfer station 14.

The front platform 17 is assumed to be empty and, therefore, it automatically rises to its uppermost position under the action of counterweights 20 and of the cylinder 158 so as to engage the bottom wall of the carrier 9. As soon as the front platform 17 reaches its uppermost position of supporting engagement with the carrier 9, the pneumatic control system of the circulating apparatus admits compressed air into the cylinders 68 (FIGS. 5 and 12b) to rock the respective levers 67 in a sense to withdraw the blocking members 66 against the bias of the respective springs 69 whereby the carrier 9 rests solely on and is ready to descend with the front platform 17. The uppermost position of the platform 17 corresponds to the position 17" of FIG. 12b. Movements of the platform 17 along the transfer station 14 (arrow 29 in FIG. 3) are controlled by the brake mechanism 130 of FIG. 10 and by the cylinder 158 while the structure illustrated in FIG. 6 prevents the covers 42, 63a from participating in such movements so that the front sides of the carrier 9 and of the empty storing device 125 are exposed and the element 150 may transfer consecutively assembled rows of cigarettes Z into the storing device.

When the storing device 125 has received a requisite supply of cigarettes, the cam 113 (see FIG. 8) actuates the valve 114 which permits inflow of compressed air into the cylinder 88 (FIG. 6) whereby the cylinder expels the piston rod 89 and the latter depresses the rod 85 against the bias of springs 86 so that the levers 84 pivot about the respective pins 83 in an anticlockwise direction, as viewed in FIG. 6, and withdraw their hook-shaped end portions from the respective recesses 61. The cover 42 is now free to descend by gravity and entrains the cover 63a to close the front side of the storing device 125 which is now filled with cigarettes.

In the next step, the brake mechanism 130 permits the front platform 17 to descend rapidly to its lowermost position (FIG. 8). Shortly before the platform 17 reaches such lower end position, the cam 112 engages and shifts the slide bar 110 against the bias of the spring 111, and this slide bar is free to return to the position of FIG. 8 as soon as it is bypassed by the cam 112. The front end portion of the slide bar 110 then cooperates with the upper end face of the cam 112 to prevent upward movement of the front platform 17 under the action of counterweights 20 and of the cylinder 158 until such time when the carrier 9 moves to the left (arrow 30 in FIG. 8) and displaces the stop 109 against the bias of the spring 111.

When the front platform 17 assumes the position of FIG. 8, the blocks 64, 65 at the underside of the bottom wall 40 of the carrier 9 are located behind the lugs 95 on the columns 94 of the trolley 93 (see FIG. 7). This trolley is held in its foremost position by the piston rod 102a of the cylinder 102 and, in a subsequent step, the pneumatic control system of the circulating apparatus admits compressed air to the cylinder 102 so as to rock the lever 97 in an anticlockwise direction, as viewed in FIG. 7, and to entrain the trolley 93 along the guide rods 23 whereby the lugs 95 entrain the blocks 64, 65 and transfer the carrier 9 from the front platform 17 onto the arms 107 of the rear platform 24 which latter is assumed to occupy its lowermost position. When the trolley 93 transfers the carrier 9 from the platform 17 onto the platform 24, it occupies the position of FIG. 7 and the bottom wall 40 of the carrier 9 rests on the rails 96. The valve 247 which admits compressed air to the cylinder 102 is shown in FIG. 12b and is actuated by the front platform 17 when the latter assumes its lowermost position.

As the bottom wall 40 of the carrier 9 travels along the rails 96, its rear wall 41 engages the stop 109 and lifts the slide bar 110 against the bias of the spring 111 so that the slide bar becomes detached from the cam 112 and permits the counterweights 20 and the cylinder 158 to return the front platform 17 to its uppermost position (17″ in FIG. 12b). The carrier 9 now rests on the arms 107 of the rear platform 24 and is ready to advance toward the carriage 4 (arrow 31 in FIGS. 3 and 7). Of course, when the front platform 17 reaches its uppermost position, it immediately engages the other carrier 15 which accommodates the next empty storing device and which then assumes a position corresponding to the phantom-line position 9′ of FIG. 3.

When the carrier 9 enters the rear platform 24, it triggers a pneumatic mechanism including a cylinder 256 (FIG. 12b) which entrains the chain 26 so that this chain may lift the rear platform toward the carriage 4 and automatically introduces the side wall 125a of the storing device 125 into the slot 124b of the fork 124. During such upward movement of the rear platform 24, the carrier 9 rests on the arms 107 and its bottom wall 40 is automatically engaged by the spring-biased brackets 12 which are deflected outwardly and thereupon return to the positions of FIG. 2 in which they support the carrier and permit the rear platform to return to the position of FIG. 2 in order to receive the other carrier 15.

In the final stage of the operation, the carrier 9 causes the cylinder 122a of the coupling device 6 to rock the lever 117a in a sense to connect the coupling member 127 to the lower run of the chain 7 and to return the storing device 125 onto the magazine 160. The manner in which the storing device 125 becomes disengaged from the carrier 9 will be readily understood by referring to FIG. 4, i.e., the fork 124 simply pushes the storing device to the left (arrow 10b) whereby the side wall 125a moves away from the stop 55, the rear wall 125b becomes disengaged from the spring 58, the side wall 125a swings the lever 57, the rib 63 slides in the recesses 60, and the bottom wall of the storing device slides between the rails 50, 51. The parts 50–52 and 54–58 together constitute a holder means for a storing device insuring that the storing device is held against movements in any direction excepting in directions indicated by arrows 10a, 10b, i.e., toward and away from the magazine 160 and in substantial parallelism with the longitudinal extension of the bottom wall 40.

The control system of FIGS. 12a and 12b operates as follows:

An electrically controlled valve 208 (shown in the lower left-hand corner of FIG. 12a) is connected in an electric circuit including a pushbutton 200 which is actuated by the operator to place the circulating apparatus in operative condition. The electric circuit of the valve 208 includes a switch 201 which is closed by the last cigarette Z′ of each newly asembled row in response to increasing suction in the interior of the lifter 151 when the latter assembles a row of cigarettes Z. The manner in which suction within the lifter 151 increases at the time this lifter assembles a row of cigarettes is fully described in the Kochalski et al. application Ser. No. 181,669. The lifter is constantly connected to the suction fan 156 (conduit 156a in FIG. 1).

The valve 208 controls the flow of compressed air through a conduit 209 which connects the main valve 210 with a main supply line 203 leading to a conditioning device 204. This device 204 receives compressed air through a conduit 207 which is connected to a further conduit 205 by a manually operable valve 206. The intake end of the conduit 205 is connected to the compressor 157 (FIG. 1).

When the valve 208 opens the conduit 209, compressed air flows into the main valves 210, 211 and causes the valve members of these valves to move to the right, as viewed in FIG. 12a, whereby the valve 210 permits flow of compressed air from the main line 203 into a conduit 212 which contains a throttle valve 214 and which leads to one chamber of the pneumatic cylinder 152. The piston in the cylinder 152 then moves in a direction to the right and rocks the lever 154 in an anticlockwise direction so as to move the lifter 151 to its phantom-line position 151′ whereby the lifter actuates a valve 215 which then permits flow of compressed air through a conduit 216, through the open main valve 211 and into a further conduit 217 leading to the main valve 218. The valve member of the main valve 211 is biased by a spring 211a which resists displacement of the valve member in response to pressure of compressed air admitted through a conduit 209a connecting the conduit 209 with the valve 211. Compressed air flowing through the conduit 217 displaces the valve member of the valve 218 in a direction to the right, as viewed in FIG. 12a, whereby the valve 218 permits compressed air to flow from the main line 203 through a conduit 219, through a throttle 220, and into the left-hand chamber of the cylinder 147 so that the piston in the cylinder 147 rocks the lever 221 in an anticlockwise direction and causes the transferring element 150 to move to its phantom-line position 150′ which results in transfer of a newly assembled row of cigarettes Z from the underside of the lifter 151 onto the bottom wall of an empty storing device 125 which is assumed to be accommodated in the carrier 9 advancing with the front platform 17 along the transfer station 14. When the transferring element reaches its phantom-line position 150′, it actuates shortly a valve 222 which permits a blast of compressed air to flow through conduits 223, 224 leading to the valves 218, 225 so that the blast of air returns the valve member of the valve 218 to its original position. As soon as the valve member of the main valve 218 returns to its original position, the valve 218 permits flow of compressed air from the main line 203, through a conduit 226, through a throttle valve 227, and into the right-hand chamber of the cylinder 147 so that the piston rod of this cylinder rocks the lever 221 in a clockwise direction and retracts the element 150 (arrow 228) to its full-line position. While returning to its full-line position, the element 150 shortly actuates a valve 229 to send a blast of compressed air from a branch line 230a (communicating with the main line 203) into a conduit 230 so as to move the valve member of the main valve 225 in a direction to the right, as viewed in FIG. 12a, whereby the valve 225 opens a passage between the conduit 224 and a conduit 231. The conduits 223, 224, 231 do not contain compressed air at this time.

As the transferring element 150 continues to move to its full line position, it actuates a valve 232 which is installed in a conduit 233 leading to the main valve 210 and connected to the branch line 230a which communicates with the main line 203. The main valve 210 then closes while compressed air flows through the conduit 233 and into the main valve 235 which is connected with the conduit 233 by a further conduit 234. When the valve member of the valve 210 returns in a direction to the left, it connects the main line 203 with a conduit 236 leading to a throttle 237 and connected with the right-hand chamber of the cylinder 152. Therefore, the piston rod of the cylinder 152 rocks the lever 154 in a clockwise direction and returns the lifter 151 to its full-line position in which the lifter is immediately adjacent to the upper run of the conveyer 512 and begins to assemble a new row of cigarettes Z. As the lifter moves away from its phantom-line position 151', it releases the valve 215 which closes to complete the first phase of the operation.

The next phase begins as soon as the lifter 151 completes the formation of a new row of cigarettes and is triggered by the last cigarette Z' of the next row which causes the switch 201 to complete the electric circuit of the valve 208 in the previously described manner. In this second stage, the transferring element 150 again actuates the valve 222 for a short period of time (when it assumes the phantom-line position 150') and permits a blast of compressed air to flow from the conduit 212 into the conduit 223 and to move the valve member of the valve 218 in a direction to the left and to flow through the conduit 224, through the valve 225 and through the conduit 231 into the main valve 235 whose valve member is shifted to the right. When the transferring element 150 then returns to its full-line position, it actuates the valve 229 without any immediate effect because the valve member of the main valve 225 has moved to the right in the first phase of the transferring operation, i.e., when the first row of cigarettes was deposited in the empty storing device 125. Such rightward movement of the valve member forming part of the valve 225 has been caused by compressed air flowing through the conduit 230 as described hereinabove.

The transferring element 150 then actuates the valve 232 which permits compressed air to flow into the conduit 233 to return the valve member of the main valve 210 in a direction to the left and to send compressed air through the conduit 234 and through the main valve 235 into a conduit 284 leading to the chamber of the pneumatic cylinder 145. The piston of the cylinder 145 is biased by a spring which resists movements of this piston in response to pressure exerted by compressed air admitted through the conduit 284 so that the shaft 135 normally assumes its lowermost position in which the pawl 134 is in engagement with and in which the pawl 133 is spaced from the teeth of the ratchet wheel 132. However, when the conduit 284 admits compressed air into the chamber of the cylinder 145, the pawl 134 moves away from the wheel 132 and the latter is free to turn through an angle corresponding to one-half the distance between two adjacent teeth thereon before the pawl 133 arrests further rotation of the wheel 132 and further descent of the front platform 17. The engagement between the transferring element 150 and the valve 232 is of short duration so that pressure in the cylinder 145 drops and the shaft 135 automatically returns to its lowermost position thus permitting small angular movement of the wheel 132 through a distance equal to one-half the distance between a pair of adjacent teeth thereon so that, after the shaft 135 returns to its lowermost position, the total angular displacement of the wheel 132 equals the width of a tooth thereon which is sufficient to permit descent of the storing device 125 through a distance approximating the diameter of a cigarette such as is necessary to make sure that the cigarettes of a newly assembled row are deposited in gaps defined by the cigarettes in the uppermost row already accommodated in the storing device. When the valve 232 closes, it permits the conduit 233 to communicate with the atmosphere so that pressure prevailing in the cylinder 145 drops immediately and the spring-biased piston of this cylinder descends to the position of FIG. 12a.

We prefer to construct the pneumatic control system in such a way that the storing device 125 descends through a distance equal to the diameter of a cigarette after the second row of cigarettes is deposited therein. This is of advantage because, while the lifter 151 assembles and while the element 150 transfers the first two rows of cigarettes into the storing device 125, the front platform 17 has sufficient time to return from its lowermost position into supporting engagement with the carrier 9 which is assumed to accommodate the empty storing device 125 while taking a position corresponding to the phantom-line position 9' of FIG. 3.

As stated hereinabove, the main valves 210, 211, 218, 225 and 235 are preferably assembled into a first group, and the main valves 238, 255, 242, 277 and 251 are preferably assembled into a second group which controls movements of storing devices between the magazine 160 and the circulating apparatus, movements of carriers 9, 15 within the circulating apparatus, and release of the covers 42, 63a in the following manner:

It is necessary that the front platform 17 descend below the transfer station 14 in order to make sure that a filled storing device and the carrier which accommodates such filled storing device cannot interfere with movements of an empty storing device which is about to receive a first row of cigarettes. As shown in FIG. 6, the overall height of the carrier cover 42 exceeds the height of a storing device 125 and the height of stacked cigarettes which are accommodated in a filled storing device. In other words, the length of that section of the endless path for the carriers 9, 15 which extends along the transfer station 14 (arrow 29 in FIG. 3) must exceed the height of a stack of cigarettes by a distance equal to the difference between the height of a carrier and the height of a stack. On the other hand, it is important that the carrier whose storing device has received the last row of cigarettes descend rapidly in order to provide room for descent of the other carrier and for transfer of cigarettes into the next storing device, i.e., there remains very little time for descent of the front platform 17 to its lowermost position. In order to save time, the brake mechanism 130 permits the front platform 17 to descend very rapidly and without interruptions as soon as the storing device supported by the platform 17 receives the last or uppermost row of cigarettes. Such uninterrupted descent of the front platform 17 is brought about in the following manner:

The descending front platform 17 actuates the valve 276 at the time the element 150 has transferred the last row of cigarettes into the storing device 125 accommodated in the carrier 9. The valve 276 opens a conduit 239 leading to the main valve 238 whose valve member moves to the right. The valve 238 now opens a passage connecting the main line 203 with a conduit 240 leading to the cylinder 129 whose piston rod 129a now tends to move the member 142 beneath the head 140 of the stud 139 in a manner as described in connection with FIG. 10. When the element 150 has transferred the last row of cigarettes into the storing device 125 supported on the front platform 17 and is on its way back to the full-line position of FIG. 12b, it actuates the valve 232 which causes the piston in the cylinder 145 to move upwardly and to lift the head 140 of the stud 139 so that the member 143 enters between the head 140 and the bracket 141 to prevent the upper pawl 134 from returning into engagement with the ratchet wheel 132. When the transferring element 150 returns to its full-line position of FIG. 12a, it releases the valve 232 and the latter permits compressed air to escape from the cylinder 145 whereby the spring 142 withdraws the lower pawl 133 from engagement with the ratchet wheel 132 and the front platform is free to rapidly descend by gravity and under the action of the cylinder 158 to assume the full-line position 17 of FIG. 12b. The descending platform 17 actuates the valve 114 which connects the branch line 230a with a conduit 241a leading to the main valve 242 whose valve member is then displaced in a direction to the left. The conduit 241a communicates with a conduit 243 leading to the main valve 225 whose valve member is also displaced in a direction to the left. The valve member of the valve 242 then permits compressed air to flow from the main line 203 into a conduit 244 leading to the cylinder 172 (see also FIG. 11) which causes the brackets 13 to advance the carrier 15 along the upper horizontal section of the endless path (arrow 28 in FIGS. 3 and 12b) so that the empty storing device which is accommodated in the carrier 15 may move to a position in which it can receive the first two rows of cigarettes. The carrier 15 is supported by the blocking members 66, i.e., it does not rest on the front platform 17 which still supports the carrier 9 with the by now filled storing device 125 therein. Thus, the element 150 may begin to transfer rows of cigarettes into a new storing device at the time the filled storing device 125 is still accommodated in the carrier 9 which is supported by the front platform 17 in the latter's lowermost position.

When the platform 17 reaches its lowermost position, it actuates the valve 247 which admits compressed air from the main line 203, through the main valve 242, and into the lower chamber of the double-acting cylinder 102 (see also FIG. 7) which rocks the lever 97 in a sense to move the trolley 93 and the carrier 9 onto the arms 107 of the rear platform 24. As shown in FIG. 12b, the aforementioned conduit 244 communicates with the upper chamber of the cylinder 102 so that this cylinder automatically moves the trolley 93 beneath the front platform 17 at the time the conduit 244 admits compressed air into the cylinder 172. In other words, the trolley 93 is always in a position to receive a carrier which accommodate a storing device at the time the front platform 17 descends to its lowermost position.

When the carrier 9 moves along the rails 96, its rear wall 41 engages the stop 109 which actuates a valve 249 at the time the platform 17 is free to return to its upper end position 17". The valve 249 admits compressed air into a conduit 250 which is connected with the main valve 251 so that the valve member of the valve 251 moves in a direction to the right, as viewed in FIG. 12b. The conduit 250 communicates with a further conduit 253 leading to the main valve 242 and with a conduit 254 which is connected to the main valve 255. The valve members of the main valves 242, 255 are displaced in a direction to the right. The valve 251 now admits compressed air from the main line 203 into a conduit 252 leading to the cylinder 256 whose piston rod is operatively connected with the chain 26'; the piston rod is withdrawn into the cylinder 256 and the rear platform 24 is caused to ascend (arrow 31) together with the carrier 9 and with the filled storing device 125 which is accommodated in the carrier 9. When the rear platform 24 reaches its uppermost position, the carrier 9 is automatically transferred onto the spring-biased brackets 12 and is prevented from descending with the rear platform when the latter returns to the full-line position of FIG. 12b.

As soon as the carrier 9 is lifted by the rear platform 24 all the way to its uppermost position 9'' of FIG. 12b, the filled storing device 125 engages a trip 163 which actuates the valve 258 which is mounted in a branch line 230b communicating with the main line 203. The valve 258 then admits compressed air into the cylinder 122a of the coupling 6 so that the piston rod of the cylinder 122a causes the coupling member 127 to engage the chain 7 whereby the chain 7 entrains the filled storing device 125 onto the magazine 160. Of course, and as explained hereinabove, the side wall 125a of the filled storing device 125 enters the slot 124b of the fork 124 in a fully automatic way as soon as the carrier 9 reaches its uppermost position (indicated by reference character 9u in FIG. 12b).

When the valve 258 opens in response to upward movement of the filled storing device, it connects the branch line 230b with a conduit 259 leading to the valve 251 whose valve member returns to the left to permit flow of compressed air from the main line 203 into a conduit 260 leading to the upper chamber of the cylinder 256 which returns the rear platform 24 to its lowermost position. The valve 258 closes automatically when the filled storing device 125 is removed from the carrier 9 and releases the trip 163.

When the carriage 4 reaches the phantom-line position 4" of FIG. 12b, the filled storing device 125 is returned onto the magazine 160. The carriage then actuates a trip 261 which causes the valve 164 to admit compressed air from a branch line 230c into a branch line 230d leading to a valve 264 forming part of the mechanism 159. The valve 264 is maintained in open position by a trip 262 fixed to the piston rod of the cylinder 162 (see also FIG. 1). Compressed air is now free to flow into the pneumatic cylinder 166 which disengages the bolt 165 from one of the pins 170. At the same time, a conduit 230e admits compressed air into the cylinder 162 which causes the magazine 160 to advance through a distance necessary to move the next empty storing device into alignment with the carriage 4. The bolt 165 and the pins 170 form a locking device for the magazine to insure that this magazine cannot change its position excepting at the time the carriage 4 has returned a filled storing device from the circulating apparatus. When the magazine 160 has advanced through a distance corresponding substantially to the width of a storing device, the trip 262 assumes the phantom-line position 262' and actuates a valve 267 after having released the valve 264. The valve 264 closes and the valve 267 opens so that the spring-biased piston rod of the cylinder 166 may move the bolt 165 into locking engagement with the next pin 170'. The valve 267 permits compressed air to flow into the cylinder 122 (conduit 230f) whose piston rod 121 (see FIG. 9) causes the coupling member 126 to engage the chain 8 so that the carriage 4 returns to the full-line position of FIG. 12b and entrains the next empty storing device into the circulating apparatus. As the carriage 4 moves away from its phantom-line position 4", the trip 261 releases the valve 164 so that the cylinder 162 is sealed from the source of compressed air. As shown in FIG. 12b, the cylinder 162 is connected with the conduit 260 by a line 260a so that, when the cylinder 256 causes the rear platform 24 to descend along the guide rods 25, the piston of the cylinder 162 also returns to its normal position (arrow 160b) in which it is ready to advance the magazine 160 (arrow 160a) as soon as the valve 164 opens. As the piston of the cylinder 162 returns to the position of FIG. 12b, the valve 267 closes and the valve 264 opens because the trip 262 returns to its full-line position.

As mentioned hereinabove, the carrier 9 moving along the rails 96 engages the stop 109 which actuates the valve 249 so that the latter admits compressed air through the conduit 250, through the conduit 253 leading to the main valve 242, and through the conduit 254 which is connected to the main valve 255 whereby the valve members of the valves 242, 255 are moved to the right, as viewed in FIG. 12b. The valve 255 now seals a conduit 290 from the main line 203 so that the cylinders 68 for the blocking members 66 are idle. Consequently, the springs 69 (see FIG. 5) cause the levers 67 to move the blocking members 66 toward each other before the carrier 9 moves along the upper horizontal section of its endless path (arrow 28 in FIG. 3). At the same time, the main valve 255 admits compressed air from the main line 203 into a conduit 293 and through a throttle valve 294A into the lower chamber of the cylinder 158 which then tends to move the front platform 17 in upward direction. Such upward movement of the front platform takes place immediately after the carrier 15 containing a filled storing device has been transferred (trolley 93 of FIG. 7) onto the arms 107 of the rear platform 24 because the carrier advancing along the rails 96 engages the stop 109 and disengages the slide bar 110 from the cam 112 so that the front platform 17 is free to ascend in response to upward displacement of the piston in the cylinder 158 and also under the action of the counterweights 20. While the platform 17 ascends, the carriage supporting an empty storing device rests on the blocking members 66 which have been moved toward each other by springs 69 because the cylinders 68 are sealed from the source of compressed air.

The ascending platform 17 engages a trip 286 which opens a valve 287 so that the latter permits flow of compressed air from the branch line 230a into a conduit 288 to move the valve member of the main valve 238 in a direction to the left, and into a conduit 289 which communicates with the conduit 288 and which admits compressed air to the right-hand side of the main valve 255 so that the valve member of the valve 255 moves in a direction to the left, as viewed in FIG. 12b. The main valve 255 now permits compressed air to flow from the main line 203 into the conduit 290 and into the cylinders 68 so that the levers 67 withdraw the blocking members 66 and the carrier supporting an empty storing device comes to rest on the front platform 17 (position 17'').

In order to insure that the front platform 17, while descending from its upper end position 17'', is not hindered by friction at the time the weight of this platform including the weight of all parts supported thereby is comparatively small, the platform 17 actuates the valve 294 as soon as it assumes the intermediate position 17' of FIG. 12b. The valve 294 is mounted in the conduit 284 and connects this conduit with a conduit 285 leading to the upper chamber of the cylinder 158 so that the piston rod of this cylinder forces the front platform to descend along the transfer station 14 to the extent permitted by the brake mechanism 130. The valve 294 remains engaged by the front platform until shortly before the latter assumes its lowermost position 17, i.e., until such time as the weight of stacked cigarettes has been added to the weight of the front platform to insure that the latter descends by gravity as soon as the cylinder 129 receives a supply of compressed air. As explained hereinabove, the conduit 284 also supplies compressed air to the cylinder 145. The lower chamber of the cylinder 158 is free to communicate with the atmosphere through the conduit 293 which is connected to the main line 203 only at the time the front platform is ready to return to its uppermost position 17'', i.e. at a time when the valve 294 is closed.

The main valve 277 controls the cylinder 88 for the mechanism (FIG. 6) which retains the covers 42, 63a in raised position. As shown in FIG. 12b, the connection between the valve 277 and cylinder 88 comprises a conduit 278. The valve 277 is further connected with a conduit 271 containing a throttle 270 and communicating with a conduit 274 which is connected to the conduit 239. A further conduit 272 connects the main valve 277 with a conduit 273 which is connected to the conduit 272 by a throttle valve 270a and which communicates with a conduit 275 leading to the cylinder 102. The conduit 275 is connected with the main line 203 in response to opening of the valve 247. When the valve 276 admits compressed air into the cylinder 129 to disengage the upper pawl 134 from the ratchet wheel 132, the valve 276 also admits compressed air into conduits 239, 274, 271 and into the main valve 277 so that the valve member of the valve 277 moves to the right, as viewed in FIG. 12b, and permits flow of compressed air from the main line 203 into the conduit 278 and to a cylinder 279 which causes the guide device 280 to move away (arrow 281) from the path of the covers 42, 63a. The guide device 280 then actuates a valve 282 which admits compressed air from the conduit 278 into the cylinder 88 so that the latter permits the covers 42, 63a to descend in a manner as described in connection with FIG. 6.

The construction of the guide device 280 is fully disclosed in the application Ser. No. 181,669 of Kochalski et al. The purpose of this guide device is to assist the element 150 to properly transfer newly assembled rows of cigarettes into a storing device which is adjacent to the transfer station 14. The guide device 280 is mounted between the lifter 151 and the path of the front platform 17 and may extend slightly into the storing device at the time it cooperates with the element 150 to assist the latter in transferring newly assembled rows of cigarettes. Consequently, at the time the storing device supported by the front platform 17 is filled so that its cover 63a should descend to closing position, the guide device 280 must be withdrawn from the path of the cover. This is insured in a very simple way if the guide device (in its retracted position 280') serves as a means for permitting flow of compressed air to the cylinder 88, i.e., the covers 42, 63a cannot descend before the guide device 280 is retracted from their path.

A very important advantage of the pneumatic control system is that it can circulate storing devices in a manner to insure that the articles stored in such devices are protected from shocks. It will be readily understood that excessive shaking of storing devices or abrupt termination of intermittent movements performed by the storing devices while circulating in the apparatus of FIG. 2 could cause the ends of cigarettes Z to discharge some of the tobacco which would contaminate the machine. We have found that a pneumatic control system is preferable over a purely mechanical control system particularly since the machine of FIG. 1 utilizes a pneumatically operated lifter and certain other pneumatically operated parts which are embodied in the first main component $A_1$ so that a source of compressed air is available at all times.

The aforementioned shock absorbers 47, 48, 103 and 161 assist the respective pneumatic cylinders to insure that movements initiated by such cylinders do not come to an abrupt end to thereby protect the cigarettes from undesirable vibrations.

Referring again to FIG. 1, it will be readily understood that the magazine 160 may constitute the first of a train of interconnected magazines so that the next magazine automatically enters the cigarette making machine and is coupled to the circulating apparatus as soon as the last empty storing device has been withdrawn from the preceding magazine. The hook 160h which projects from the front face of the magazine 160 may be used for coupling this magazine to a similar conveyance.

The storing devices or trays 501 which accommodate filters F may be filled by passing through a circulating apparatus which is analogous to or identical with that shown in FIG. 2.

Without further analysis, the foregoing will so fully reveal the gist of the present invention that others can, by applying current knowledge, readily adapt it for various applications without omitting features that, from the standpoint of prior art, fairly constitutes essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for circulating storing devices for cigarettes and similar articles along a transfer station at which the articles are transferred into and at least partially fill the storing devices, said apparatus comprising a frame; a series of several components forming a carrier unit adapted to accommodate a storing device; guide means provided in said frame and defining an endless path for said carrier unit, said path comprising a plurality of sections including a path section in which the carrier unit may advance while passing along said transfer station; a plurality of advancing means for moving said carrier unit in the sections of said path, each of said advancing means being arranged to engage the carrier unit while the carrier unit moves in the respective section of said path and each thereof being disengaged from the carrier unit when the carrier unit moves in another section of said path; and means for delivering empty storing devices into and for withdrawing filled storing devices from said carrier unit at a point upstream of said path section so that a filled storing device accommodated in said carrier unit may be withdrawn and that an empty storing device may be introduced into said carrier unit before the carrier unit advances to said path section.

2. An apparatus for circulating storing devices for cigarettes and similar stick-shaped articles along a transfer station at which the articles are transferred into and at least partially fill the storing devices, said apparatus comprising a frame; a pair of carriers each of which is adapted to accommodate a storing device; guide means provided in said frame and defining an endless path for said carriers, said path including a path section in which the carriers may advance while passing along said transfer station; advancing means for intermittently moving said carriers in said path in such a way that one carrier trails behind and remains spaced from the other carrier; and means for delivering empty storing devices into said carriers at a point upstream of said path section and for withdrawing at said point filled storing devices from said carriers so that a filled storing device accommodated in one of the carriers which is momentarily located at said point may be withdrawn from said one carrier and that said one carrier may receive an empty storing device before advancing to said path section.

3. An apparatus for circulating storing devices for cigarettes and similar articles along a transfer station at which the articles are transferred into and at least partially fill the storing devices, said apparatus comprising a frame; a carrier adapted to accommodate a storing device, said carrier comprising a substantially horizontal bottom wall, a rear wall extending upwardly from said bottom wall, and holder means provided on at least one of said walls for detachably retaining a storing device in the carrier; guide means provided in said frame and defining an endless path for said carrier, said path including a path section in which the carrier may advance while passing along said transfer station; advancing means for moving said carrier in said path; and means for delivering empty storing devices into said carrier at a point upstream of said path section and for withdrawing at said point filled storing devices from said carrier so that a filled storing device accommodated in said carrier may be withdrawn and that an empty storing device may be introduced into said carrier before the carrier advances to said path section.

4. An apparatus for circulating storing devices for cigarettes and similar articles along a transfer station at which the articles are transferred into and at least partially fill the storing devices, said apparatus comprising a frame; a carrier adapted to accommodate and comprising holder means for engaging and detachably retaining a storing device; guide means provided in said frame and defining an endless path for said carrier, said path including a path section in which the carrier may advance while passing along said transfer station; advancing means for moving said carrier in said path; and means for delivering empty storing devices into said carrier at a point upstream of said path section and for withdrawing at said point filled storing devices from said carrier so that a filled storing device accommodated in said carrier may be withdrawn and that an empty device may be introduced into said carrier before the carrier advances to said path section.

5. An apparatus for circulating storing devices of the type having a bottom wall of substantially constant width along a transfer station at which cigarettes or similar articles are transferred into and at least partially fill the storing devices, said apparatus comprising a frame; a carrier adapted to accommodate and comprising holder means for engaging and detachably retaining a storing device, said carrier further comprising a substantially horizontal elongated bottom wall member having an upper side and said holder means comprising a pair of parallel rails located at the upper side and parallel with the longitudinal extension of said wall member, and resilient means for biasing one of said rails toward the other rail so that a storing device accommodated in said carrier and having its bottom wall received between said rails is resiliently secured to said bottom wall member; guide means provided in said frame and defining an endless path for said carrier, said path including a path section in which the carrier may advance while passing along said transfer station; advancing means for moving the carrier in said path; and means for delivering empty storing devices into and for withdrawing filled storing devices from said carrier at a point upstream of said path section so that a filled storing device accommodated in said carrier may be withdrawn and that an empty storing device may be introduced into said carrier before the carrier advances to said path section.

6. An apparatus as set forth in claim 5 for circulating storing devices of the type having a rear wall and a side wall both extending upwardly from said bottom wall, wherein said carrier further comprises a rear wall member having a front side extending upwardly from the upper side of said bottom wall member and wherein said holder means further comprises a batten fixed to said front side and abutting against the outer side of the rear wall forming part of a storing device whose bottom wall is received between said rails, a swingable lever mounted on said rear wall member and engaging the inner side of the rear wall of a storing device whose bottom wall is received between said rails, stop means fixed to said rear wall member and engaging the side wall of the storing device, and resilient means fixed to said rear wall member and engaging the rear wall of a storing device whose bottom wall is received between said rails to bias the rear wall of the storing device against said lever.

7. An apparatus for circulating storing devices for cigarettes and similar articles along a transfer station at which the articles are transferred into and fill the storing devices, said apparatus comprising a frame; a carrier adapted to accommodate a storing device, said carrier comprising a bottom wall, a rear wall connected to and extending upwardly from said bottom wall, and a cover member reciprocable in a vertical plane and spaced from said rear wall; guide means provided in said frame and defining an endless path for said carrier, said path including a vertical path section in which the carrier may descend while passing along said transfer station; advancing means for moving the carrier unidirectionally in said path; means for delivering empty storing devices into and for withdrawing filled storing devices from said carrier at a point upstream of said vertical path section so that a filled storing device accommodated in said carrier may be withdrawn and that an empty storing device may be introduced into said carrier before the latter advances in said vertical path section; a mechanism mounted in said frame for retaining said cover member at the time said carrier descends along said path section so as to permit transfer of articles into the storing device while the carrier advances along said transfer station; and means cooperating with said advancing means for automatically disconnecting said mechanism from said cover member when the carrier advances a storing device beyond said transfer station so that the cover member may descend by gravity.

8. An apparatus as set forth in claim 7, wherein said carrier further comprises vertical guide rods fixed to said bottom wall and reciprocably supporting said cover member.

9. An apparatus as set forth in claim 7 for reciprocating storing devices of the type having a vertically reciprocable front wall, wherein said cover member comprises connecting means automatically engaging the front wall of a storing device accommodated in said carrier whereby the front wall is retained with said cover member against movement with the storing device while the carrier advances along said transfer station so that the storing device may receive articles in the raised position of its front wall.

10. An apparatus as set forth in claim 9 for reciprocating storing devices of the type having front walls provided with horizontal edge portions at the upper ends thereof, wherein said connecting means comprises at least one block secured to said cover member and having recess means for the edge portion of said front wall, and swingable lever means cooperating with said block for retaining the edge portion in said recess means.

11. An apparatus for circulating storing devices for cigarettes and similar articles along a transfer station at which the articles are transferred into and at least partially fill the storing devices, said apparatus comprising a frame; a carrier adapted to accommodate a storing device; guide means provided in said frame and defining an endless path for said carrier, said path including a path section in which the carrier may advance while passing along said transfer station; advancing means for moving said carrier in said path; means for delivering empty storing devices into said carrier at a point upstream of said path section and for withdrawing at said point filled storing devices from said path so that a filled storing device accommodated in said carrier may be withdrawn and that an empty storing device may be introduced into said carrier before the latter advances to said path section; and pneumatic control means for actuating said advancing means.

12. An apparatus for circulating storing devices for cigarettes and similar articles along a transfer station at which the articles are transferred into and at least partially fill the storing devices, said apparatus comprising a frame; a carrier adapted to accommodate a storing device; guide means provided in said frame and defining an endless path for said carrier, said path including a path section in which the carrier may advance while passing along said transfer station; advancing means for moving said carrier in said path; means for delivering empty storing devices into and for withdrawing filled storing devices from said carrier at a point upstream of said path section so that a filled storing device accommodated in said carrier may be withdrawn from and that an empty storing device may be introduced into said carrier before the carrier advances to said path section; and pneumatic control means for actuating said advancing means, said control means comprising control valve means adjacent to said path and automatically actuated by said advancing means to initiate movements of said carrier and to initiate movements of storing devices into and from said carrier.

13. In a machine for making and handling cigarettes and similar articles, in combination, a magazine adapted to support a supply of storing devices; a transfer assembly for transferring articles into empty storing devices; an apparatus for circulating storing devices from said magazine toward and along said transfer assembly and back to said magazine, said apparatus comprising a frame, a carrier adapted to accommodate a storing device, guide means provided in said frame and defining an endless path for said carrier, said path having a vertical path section extending along said transfer assembly, advancing means for moving said carrier in said path, and means for delivering empty storing devices from said magazine into said carrier and for returning filled storing devices from said carrier into said magazine at a point upstream of said path section so that a filled storing device accommodated in said carrier may be returned into said magazine and that an empty storing device may be introduced into said carrier before the latter advances to said path section; and a mechanism for moving said magazine with respect to said circulating apparatus so as to move consecutive storing devices into a position for introduction into said carrier.

14. In a machine for making and handling cigarettes and similar articles, in combination, a magazine adapted to support a supply of storing devices; a transfer assembly for transferring articles into empty storing devices; an apparatus for circulating storing devices from said magazine toward and along said transfer assembly and back to said magazine, said apparatus comprising a frame, a carrier adapted to accommodate a storing device, guide means provided in said frame and defining an endless path for said carrier, said path having a vertical path section extending along said transfer assembly, advancing means for moving said carrier in said path, and means for delivering empty storing devices from said magazine into said carrier and for returning filled storing devices from said carrier into said magazine at a point upstream of said path section so that a filled storing device accommodated in said carrier may be returned into said magazine and that an empty storing device may be introduced into said carrier before the latter advances to said path section; a mechanism for moving said magazine with respect to said circulating apparatus so as to move consecutive storing devices into a position for introduction into said carrier; and pneumatic control means for actuating said transfer assembly, said advancing means and said mechanism in a predetermined sequence.

15. In a machine for making and handling cigarettes and similar articles, in combination, a magazine adapted to support a supply of empty and filled storing devices; a transfer assembly for transferring articles into empty storing devices; an apparatus for circulating empty storing devices from said magazine toward and along said transfer assembly where the storing devices are filled with articles and for thereupon returning filled storing devices to said magazine, said apparatus comprising a frame, a carrier adapted to accommodate an empty storing device, guide means provided in said frame and defining for said carrier an endless path having a vertical path section extending along said transfer assembly, and advancing means for moving the carrier in said path, said transfer assembly comprising a device for consecutively assembling rows of articles and a transferring element for transferring consecutively assembled rows of articles into the storing device accommodated in said carrier while the carrier advances in said vertical path section, said apparatus further comprising means for delivering empty storing devices from said magazine into said carrier and for returning filled storing devices from said carrier into said magazine at a point upstream of said path section so that a filled storing device accommodated in said carrier may be returned into said magazine and that an empty storing device may be introduced into said carrier before the carrier advances to said path section; a mechanism for moving said magazine with respect to said circulating apparatus so as to move consecutive empty storing devices into a position for introduction into said carrier; and pneumatic control means for actuating said transfer assembly, said advancing means and said mechanism in a predetermined sequence.

16. A combination as set forth in claim 15, wherein said advancing means comprises brake means for permitting stepwise descent of said carrier along said transfer assembly so that the carrier descends subsequent to introduction of consecutive rows of articles into the storing device which is accommodated in the carrier.

17. A combination as set forth in claim 16, wherein said pneumatic control means comprises valve means actuated by said transferring element subsequent to each transfer of a row of articles into the storing device which is accommodated in said carrier, and an operative connection between said valve means and said brake means for actuating said brake means in a sense to permit descent of said carrier subsequent to each transfer of articles into the storing device.

18. An apparatus for circulating storing devices for cigarettes and similar articles along a transfer station at which the articles are transferred into and at least partially fill the storing devices, said apparatus comprising a frame; at least one carrier adapted to accommodate a storing device; guide means provided in said frame and defining an endless path for the carrier, said endless path being located in a vertical plane and including a horizontal first path section, a vertical second path section adjacent to said transfer station, a horizontal third path section and a vertical fourth path section; advancing means for moving the carrier unidirectionally in said path so that the carrier advances downwardly in said second path section and upwardly in said fourth path section; and means for delivering empty storing devices into and for withdrawing filled storing devices from the carrier at the junction of said first and fourth path sections so that a filled storing device may be withdrawn and that an empty storing device may be introduced into the carrier before the carrier descends in said second path section.

19. An apparatus for circulating storing devices for cigarettes and similar articles along a transfer station at which the articles are transferred into and at least partially fill the storing devices, said apparatus comprising a frame; a pair of carriers each of which is adapted to accommodate a storing device; guide means provided in said frame and defining an endless path for said carriers, said endless path being located in a vertical plane and including a horizontal first path section, a vertical second path section adjacent to said transfer station, a horizontal third path section, and a vertical fourth path section; advancing means for moving said carriers unidirectionally in said endless path in such a way that one carrier trails behind and remains spaced from the other carrier and that the carriers advance downwardly in said second path section and upwardly in said fourth path section; and means for delivering empty storing devices into and for withdrawing filled storing devices from said carriers at the junction of said first and fourth path sections so that a filled storing device accommodated in one of the carriers which is momentarily located at said junction may be withdrawn from said one carrier and that said one carrier may receive an empty storing device before descending in said second path section.

20. An apparatus as set forth in claim 19, wherein said advancing means comprises a carrier-supporting front platform which is reciprocable along said second path section, a carrier-supporting rear platform which is reciprocable along said fourth path section, a carrier-supporting trolley which is reciprocable along said third path section, and motion transmitting means reciprocable along said first path section.

21. An apparatus as set forth in claim 19, wherein the means for delivering empty storing devices to and for withdrawing filled storing devices from said carriers comprises a carriage which is mounted in said frame and is reciprocable in a straight path perpendicular to the plane of said endless path, and means for reciprocating said carriage along said straight path.

22. An apparatus as set forth in claim 21, further comprising a pneumatic control system for said advancing means and for said reciprocating means.

23. As a novel article of manufacture, a carrier for supporting storing devices of the type adapted to receive stacked rows of cigarettes and similar articles while advancing along the transfer station of a cigarette making machine, said carrier comprising an elongated bottom wall; a rear wall rigid with and extending upwardly from said bottom wall; and holder means provided on at least one of said walls for engaging and for retaining a storing device so as to support the storing device against movements other than in the longitudinal direction of said bottom wall.

24. As a novel article of manufacture, a carrier for supporting the bottom, side and rear walls of storing devices of the type adapted to receive stacked rows of cigarettes and similar articles while advancing along the transfer station of a cigarette making machine, said carrier comprising an elongated bottom wall member having an upper side; a rear wall member rigid with and having a front side extending upwardly from said bottom wall member; and holder means provided on said wall members for engaging and for retaining a storing device so as to support the storing device against movements other than in the longitudinal direction of said bottom wall member, said holder means comprising a pair of elongated rails mounted on the upper side and parallel with the longitudinal extension of said bottom wall member, resilient means for biasing one of said rails toward the other rail so that the bottom wall of a storing device which is received between said rails is clamped to said bottom wall member, a batten fixed to the front side of said rear wall member and abutting against the outer side of the rear wall of the storing device when the bottom wall of the storing device is received between said rails, a swingable lever mounted on said rear wall member and engaging the inner side of the rear wall of the storing device, stop means fixed to said rear wall member and engaging one side wall of the storing device, and resilient means fixed to said rear wall member and engaging the outer side of the rear wall of the storing device to bias the rear wall against said lever.

25. As a novel article of manufacture, a carrier for supporting the bottom walls of storing devices of the type adapted to receive stacked rows of cigarettes and similar articles while advancing along the transfer station of a cigarette making machine, said carrier comprising an elongated bottom wall member having an upper side; a rear wall member rigid with and having a front side extending upwardly from said bottom wall member; and holder means provided on said wall members for engaging and for retaining a storing device so as to support the storing device against movements other than in the longitudinal direction of said bottom wall member, said holder means comprising a pair of elongated rails mounted on the upper side and parallel with the longitudinal extension of said bottom wall member, and resilient means for biasing one of said rails toward the other rail so that the bottom wall of a storing device which is received between said rails is clamped to said bottom wall member.

26. A carrier as set forth in claim 25, further comprising means for adjustably connecting said other rail to said bottom wall member.

27. As a novel article of manufacture, a carrier for supporting the bottom and rear walls of storing devices of the type adapted to receive stacked rows of cigarettes and similar articles while advancing along the transfer station of a cigarette making machine, said carrier comprising an elongated bottom wall member having an upper side; a rear wall member rigid with and having a front side extending upwardly from said bottom wall member; and holder means provided on said wall members for engaging and for retaining a storing device so as to support the storing device against movements other than in the longitudinal direction of said bottom wall member, said holder means comprising a pair of elongated rails mounted on the upper side and parallel with the longitudinal extension of said bottom wall member, resilient means for biasing one of said rails toward the other rail so that the bottom wall of a storing device which is received between said rails is clamped to said bottom wall member, a batten fixed to the front side of said rear wall member and abutting against the outer side of the rear wall of the storing device when the bottom wall of such storing device is received between said rails, and a swingable lever mounted on said rear wall member and engaging the inner side of such rear wall.

28. A carrier as set forth in claim 27, further comprising means for adjustably fixing said batten to said rear wall member.

29. As a novel article of manufacture, a carrier for supporting the bottom, side and rear walls of storing devices of the type adapted to receive stacked rows of cigarettes and similar articles while advancing along the transfer station of a cigarette making machine, said carrier comprising an elongated bottom wall member having an upper side; a rear wall member rigid with and having a front side extending upwardly from said bottom wall member; and holder means provided on said wall members for engaging and for retaining a storing device so as to support the storing device against movements other than in the longitudinal direction of said bottom wall member, said holder means comprising a pair of elongated rails mounted on the upper side and parallel with the longitudinal extension of said bottom wall member, adjustable means for adjusting said rails so that the bottom wall of a storing device which is received between said rails is guided on said bottom wall member, a batten fixed to the front side of said rear wall member and abutting against the outer side of the rear wall of the storing device when the bottom wall of such storing device is received between said rails, a swingable lever mounted on said rear wall member and engaging the inner side of such rear wall, stop means fixed to said rear wall member and engaging one side wall of such storing device, and resilient means fixed to said rear wall member and engaging the outer side of the rear wall to bias the rear wall against said lever, so that said storing device is resiliently secured within said carrier unit.

References Cited by the Examiner

UNITED STATES PATENTS

| | | | |
|---|---|---|---|
| 2,351,693 | 6/1944 | Molins et al. | 53—236 |
| 2,572,650 | 10/1951 | Molins | 53—236 |
| 3,018,594 | 1/1962 | Phillips et al. | 53—72 |

FRANK E. BAILEY, *Primary Examiner.*

ROBERT E. PULFREY, *Examiner.*

A. E. FOURNIER, P. H. POHL, R. J. ALVEY,
*Assistants Examiners.*